(12) United States Patent
Trinh et al.

(10) Patent No.: US 12,632,910 B2
(45) Date of Patent: May 19, 2026

(54) ARTIFICIAL INTELLIGENCE-BASED BLOCK EMBEDDING

(71) Applicant: CoreLogic Solutions, LLC, Irvine, CA (US)

(72) Inventors: Kien Trong Trinh, San Diego, CA (US); Wei Geng, San Diego, CA (US); Bin He, Philadelphia, PA (US)

(73) Assignee: CoreLogic Solutions, LLC, Irvine, CA (US)

( * ) Notice: Subject to any disclaimer, the term of this patent is extended or adjusted under 35 U.S.C. 154(b) by 0 days.

(21) Appl. No.: 18/670,606

(22) Filed: May 21, 2024

(65) Prior Publication Data

US 2024/0394813 A1 Nov. 28, 2024

Related U.S. Application Data

(60) Provisional application No. 63/469,299, filed on May 26, 2023.

(51) Int. Cl.
| | |
|---|---|
| *G06Q 50/16* | (2024.01) |
| *G06N 20/00* | (2019.01) |
| *G06Q 30/02* | (2023.01) |

(52) U.S. Cl.
CPC ............. *G06Q 50/16* (2013.01); *G06N 20/00* (2019.01); *G06Q 30/0278* (2013.01)

(58) Field of Classification Search
None
See application file for complete search history.

(56) References Cited

U.S. PATENT DOCUMENTS

| | | | | |
|---|---|---|---|---|
| 5,193,185 A | | 3/1993 | Lanter | |
| 5,361,201 A | * | 11/1994 | Jost ........................ | G06Q 40/02 |
| | | | | 705/35 |

(Continued)

FOREIGN PATENT DOCUMENTS

| | | |
|---|---|---|
| CA | 3165715 A1 | 7/2021 |
| CN | 101419623 A | 4/2009 |

(Continued)

OTHER PUBLICATIONS

Translation of Foreign document CN115271825A, retrieved from https://worldwide.espacenet.com/patent/search/family/083751482/publication/CN115271825A (Year: 2022).*

(Continued)

*Primary Examiner* — Eduardo Castilho

(74) *Attorney, Agent, or Firm* — Knobbe, Martens, Olson & Bear, LLP

(57) ABSTRACT

A computer system and associated processes for grouping similar real estate properties into contiguous neighborhoods and generating neighborhood-specific models capable of estimating property values within their neighborhoods. An artificial intelligence system directed to using a graph neural network framework to identify relationships between different parcel groups based on similar property features and embed the parcel groups into low dimensional space vectors. The method can include generating a graph and features relevant to the parcel groups that can train an embedding function that generate an embedding vector for each parcel group in a geographic unit grouping, such as a census tract. Embedding vectors of two or more parcel groups can then be compared to each other to determine whether the parcel groups are similar or to determine a housing valuation of a parcel group.

23 Claims, 9 Drawing Sheets

(56) References Cited

U.S. PATENT DOCUMENTS

| | | | | |
|---|---|---|---|---|
| 5,857,174 | A * | 1/1999 | Dugan | G06Q 30/06 |
| | | | | 705/313 |
| 7,890,509 | B1 | 2/2011 | Pearcy et al. | |
| 8,732,219 | B1 | 5/2014 | Ferries et al. | |
| 10,248,731 | B1 | 4/2019 | Brouwer et al. | |
| 10,303,816 | B2 | 5/2019 | Nakazawa | |
| 10,496,678 | B1 | 12/2019 | Tang | |
| 10,521,943 | B1 | 12/2019 | Phillips et al. | |
| 10,726,509 | B1 | 7/2020 | Cannon et al. | |
| 11,301,774 | B2 * | 4/2022 | Garcia Duran | G06N 20/00 |
| 11,373,233 | B2 * | 6/2022 | Pande | G06Q 30/0201 |
| 11,373,257 | B1 | 6/2022 | Guo et al. | |
| 11,657,633 | B1 | 5/2023 | Vandivere | |
| 11,971,263 | B1 | 4/2024 | Malshe et al. | |
| 12,461,951 | B1 | 11/2025 | Trinh et al. | |
| 2003/0158668 | A1 | 8/2003 | Anderson | |
| 2003/0158801 | A1 | 8/2003 | Chuah | |
| 2005/0288957 | A1 | 12/2005 | Eraker et al. | |
| 2009/0132469 | A1 | 5/2009 | White et al. | |
| 2013/0328882 | A1 | 12/2013 | Pirwani et al. | |
| 2014/0365470 | A1 | 12/2014 | Diamond et al. | |
| 2015/0120455 | A1 | 4/2015 | Mcdevitt et al. | |
| 2015/0186951 | A1 | 7/2015 | Wilson et al. | |
| 2015/0213160 | A1 | 7/2015 | Bright et al. | |
| 2015/0242747 | A1 * | 8/2015 | Packes | G06N 3/0442 |
| | | | | 706/17 |
| 2016/0125338 | A1 | 5/2016 | Serageldin et al. | |
| 2016/0259841 | A1 | 9/2016 | Andrew et al. | |
| 2016/0299639 | A1 | 10/2016 | Adams et al. | |
| 2016/0379388 | A1 | 12/2016 | Rasco et al. | |
| 2017/0287080 | A1 | 10/2017 | Aruswamy et al. | |
| 2017/0316324 | A1 | 11/2017 | Barrett et al. | |
| 2017/0323028 | A1 | 11/2017 | Jonker et al. | |
| 2018/0121577 | A1 | 5/2018 | Taylor et al. | |
| 2018/0158158 | A1 | 6/2018 | Coogan-Pushner | |
| 2019/0050491 | A1 | 2/2019 | Mask et al. | |
| 2019/0272669 | A1 | 9/2019 | Esposito et al. | |
| 2020/0380086 | A1 | 12/2020 | Ivanov et al. | |
| 2020/0402116 | A1 * | 12/2020 | Avrahami | G06Q 30/0278 |
| 2021/0019325 | A1 * | 1/2021 | Edge | G06F 16/9024 |
| 2021/0037394 | A1 | 2/2021 | Wainer et al. | |
| 2021/0103998 | A1 * | 4/2021 | Rose | G06Q 30/0645 |
| 2021/0125271 | A1 * | 4/2021 | O'Moore | G06Q 30/0645 |
| 2021/0256572 | A1 | 8/2021 | Rute et al. | |
| 2021/0325891 | A1 | 10/2021 | Young et al. | |
| 2021/0398227 | A1 * | 12/2021 | Hayward | G06Q 40/08 |
| 2022/0084079 | A1 * | 3/2022 | Stewart | G06Q 30/0278 |
| 2022/0180169 | A1 * | 6/2022 | Gore | G06Q 30/0205 |
| 2022/0222758 | A1 * | 7/2022 | Beckman | G06Q 50/16 |
| 2022/0292330 | A1 * | 9/2022 | Ma | G06N 3/045 |
| 2022/0292543 | A1 | 9/2022 | Henderson | |
| 2022/0327643 | A1 | 10/2022 | Law et al. | |
| 2022/0335307 | A1 | 10/2022 | Wang et al. | |
| 2022/0335353 | A1 | 10/2022 | Copley et al. | |
| 2022/0383417 | A1 | 12/2022 | Cummings | |
| 2023/0029218 | A1 | 1/2023 | Bhamidipaty et al. | |
| 2023/0119132 | A1 | 4/2023 | Cebulski et al. | |
| 2023/0153931 | A1 | 5/2023 | Lee | |
| 2023/0297834 | A1 * | 9/2023 | Chigogidze | G06Q 30/0201 |
| | | | | 706/25 |
| 2023/0385738 | A1 | 11/2023 | Lobell et al. | |
| 2024/0112257 | A1 * | 4/2024 | Sharma | G06Q 40/03 |
| 2024/0273637 | A1 * | 8/2024 | Gibson | G06Q 30/015 |
| 2025/0200618 | A1 | 6/2025 | Trinh et al. | |
| 2025/0292291 | A1 * | 9/2025 | Humphries | G06Q 30/0278 |

FOREIGN PATENT DOCUMENTS

| | | | | | |
|---|---|---|---|---|---|
| CN | 113627977 | A | 11/2021 | | |
| CN | 115018215 | A | 9/2022 | | |
| CN | 115271825 | A * | 11/2022 | | |
| WO | WO-2023141579 | A1 * | 7/2023 | | G06N 20/10 |
| WO | 2024/249178 | A1 | 12/2024 | | |
| WO | 2025/136982 | A1 | 6/2025 | | |

OTHER PUBLICATIONS

Zhang et al., "MugRep: A Multi-Task Hierarchical Graph Representation Learning Framework for Real Estate Appraisal," In Proceedings of the 27th ACM SIGKDD Conference on Knowledge Discovery & Data Mining (KDD '21), 2021, https://doi.org/10.1145/3447548.3467187 (Year: 2021).*

Yu et al., "Research on real estate pricing methods based on data mining and machine learning," Neural Comput & Applic 33, 3925-3937, 2021, https://doi.org/10.1007/s00521-020-05469-3 (Year: 2021).*

B. Trawiński et al., "Comparison of expert algorithms with machine learning models for real estate appraisal," 2017 IEEE International Conference on INnovations in Intelligent SysTems and Applications (INISTA), Gdynia, Poland, 2017, pp. 51-54, doi: 10.1109/INISTA.2017.8001131 (Year: 2017).*

Lin, Sandgi. "Home Embeddings for Similar Home Recommendations." https://www.zillow.com/tech/embedding-similar-home-recommendation/ Accessed May 21, 2024.

"Knowledge graph embedding," Wikipedia, Oct. 25, 2023, 9 pages. URL: https://en.wikipedia.org/w/index.php?title=Knowledge_graph_embedding&oldid=1181784194.

Han, S., et al., "Improving Real Estate Appraisal with POI Integration and Areal Embedding," arXiv.org, Artificial Intelligence (cs.AI), Nov. 20, 2023, 13 pages.

International Preliminary Report on Patentability for PCT Application No. PCT/US2024/030350, mailed Dec. 11, 2025.

International Search Report and Written Opinion for PCT Application No. PCT/US24/030350, mailed Oct. 16, 2024.

International Search Report and Written Opinion for PCT Application No. PCT/US24/060576, mailed Feb. 12, 2025.

Li, C.C., et al., "Look Around! A Neighbor Relation Graph Learning Framework for Real Estate Appraisal," arXiv.org, Machine Learning (cs.LG), Dec. 23, 2022, 10 pages.

Lisowski, P. et al., "Topological Model of Selected Cadastral Structures Visualized in Form of Graphs", Geomatics and Environmental Engineering, 2017, vol. 11(4), pp. 51-63.

Rao, B., et al., "An approach to merging of two community subgraphs to form a community graph using graph mining techniques," IEEE International Conference on Computational Intelligence and Computing Research, Dec. 18, 2014, pp. 460-466.

Wu, P., et al., "Urban parcel grouping method based on urban form and functional connectivity characterisation," International Journal of Geo-Information, Jun. 2019, vol. 8, 27 pages.

Yang, A., et al., "Graph Convolutional Network-Based Model for Megacity Real Estate Valuation," IEEE Access, vol. 10, Sep. 2022, pp. 104811-104828.

Ye, X., et al., "Automating land parcel classification for neighborhood-scale urban analysis," International Journal of Digital Earth, 2019, vol. 12, pp. 1396-1405.

Zhang, W., et al., "MugRep: A Multi-Task Hierarchical Graph Representation Learning Framework for Real Estate Appraisal," arXiv.org, Machine Learning (cs.LG), Aug. 2, 2021, 11 pages.

* cited by examiner

*400*

402

BEGIN BLOCK GROUP EMBEDDING ROUTINE

404

OBTAIN PROPERTY DATA AND CENSUS DATA

405

406

*GENERATE NETWORK OF BLOCK GROUPS RELATIONSHIP USING CENSUS DATA*

408

*EXTRACT FEATURES OF CENSUS BLOCK GROUPS USING PROPERTY DATA AND CENSUS DATA*

410

GENERATE BLOCK GROUP EMBEDDING VECTORS USING DIMENSIONAL REDUCTION USING EXTRACTED FEATURES

412

FINISH BLOCK GROUP EMBEDDING ROUTINE

*502*

BEGIN DIMENSIONAL REDUCTION ROUTINE

*500*

*504*

INPUT NETWORK OF BLOCK GROUP RELATIONSHIP DATA AND FEATURES OF BLOCK GROUP DATA INTO AN AI MODEL

*506*

OBTAIN EMBEDDING FUNCTION

*508*

INPUT FEATURES OF BLOCK GROUP DATA FOR EACH BLOCK GROUP AND NEIGHBORING BLOCK GROUPS INTO EMBEDDING FUNCTION

*510*

DERIVE EMBEDDING VECTOR FOR EACH BLOCK GROUP

*512*

FINISH DIMENSIONAL REDUCTION ROUTINE

ARTIFICIAL INTELLIGENCE-BASED BLOCK EMBEDDING

CROSS-REFERENCE TO RELATED APPLICATIONS

This application claims the benefit of priority to U.S. Provisional Application No. 63/469,299, entitled "ARTIFICIAL INTELLIGENCE-BASED BLOCK EMBEDDING" and filed on May 26, 2023, which is hereby incorporated by reference herein in its entirety.

TECHNICAL FIELD

The present disclosure generally relates to using artificial intelligence and computer processes to decrease computational processing requirements for grouping geographical units.

BACKGROUND

The United States (U.S.) Census Bureau categorizes real estate properties in geographic units such as but not limited to individual properties, blocks, block groups, tracts, zip codes, metropolitical divisions, metropolitan statistical areas, and states. A census tract represents the smallest territorial entity that population data is available. Census tracts are designed to be relatively homogeneous units concerning population characteristics, economic status, and living conditions, averaging populations of about 4,000. A census block is the smallest geographical unit for the tabulation of 100 percent of data collected from all houses rather than samples of houses. A census block group is a geographical unit between the census tract and the census block. Typically, census block groups have a population of 600 to 3,000 people, are roughly 50 blocks per block group, and are all census blocks with the same first digit of a three-digit block code within a given census tract. The census block group is the smallest geographical unit that the U.S. Census Bureau publishes sample data on, which is only collected from a fraction of all households. Thus, the census block group is the smallest geographic unit with public records disclosed by the U.S. Census Bureau.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a computer-implemented method for embedding parcel groups. The method comprises obtaining a geographic unit grouping, wherein the geographic unit grouping includes a first parcel group and a second parcel group, wherein the first parcel group includes at least one parcel; obtaining property-level data for the first and second parcel groups in the geographic unit grouping; generating a graph model using the property-level data, wherein the graph model indicates a relationship between a geographic area of the first parcel group and a geographic area of the second parcel group; generating property features for each of the first and second parcel groups using the property-level data; generating an embedding vector for each of the first and second parcel groups using the property features and the graph model; applying the embedding vectors as an input to an artificial intelligence model, wherein application of the embedding vectors as the input to the artificial intelligence model causes the artificial intelligence model to produce an output; and generating an outcome for the first parcel group based on the output.

The method of the preceding paragraph can include any sub-combination of the following features: where the property-level data includes property data and census data; where generating the property features for each of the first and second parcel groups includes an aggregation of parcel features for each of the at least one parcels in the first and second parcel groups respectively; further including generating a visualization of the embedding vectors; where the artificial intelligence model is selected from the group including an automated valuation model, a rental valuation model, and a neighborhood recommendation model; and where the outcome is selected from the group including a housing value, a rental value, and a recommendation for the first parcel group.

The method of the preceding paragraphs can include the following features: where generating the embedding vector for each of the first and second parcel groups further includes: obtaining a neighbor predicting artificial intelligence model; generating an embedding function using the property features and the graph model as an input to train the neighbor predicting artificial intelligence model; determining a neighbor score between the first and second parcel groups corresponding to the property features; and generating the embedding vector for the first parcel group by inputting into the embedding function the property features of the first parcel group and, if the neighbor score meets a neighbor threshold, the property features of the second parcel group.

The method of the preceding paragraph can include any sub-combination of the following features: where determining the neighbor score further includes weighing the property features unequally; where obtaining the geographic unit grouping further includes encoding each of the first and second parcel groups; where the embedding vectors includes a dimensionally reduced vector of the first and second parcel groups, and where a dimension is encoded with the property feature of the first and second parcel group; and where the embedding vectors includes 32-dimensions.

One aspect of the disclosure provides a system for parcel group embedding. The system comprises memory that stores computer-executable instructions. The system further comprises a processor in communication with the memory, wherein the computer-executable instructions, when executed by the processor, cause the processor to: obtain a geographic unit grouping, wherein the geographic unit grouping includes a first parcel group and a second parcel group, wherein the first parcel group includes at least one parcel; obtain property-level data for the first and second parcel groups in the geographic unit grouping; generate a graph model using the property-level data, wherein the graph model indicates a relationship between a geographic area of the first parcel group and a geographic area of the second parcel group; generate property features for each of the first and second parcel groups using the property-level data; generate an embedding vector for each of the first and second parcel groups using the property features and the graph model; apply the embedding vectors as an input to an artificial intelligence model, wherein application of the embedding vectors as the input to the artificial intelligence model causes the artificial intelligence model to produce an output; and generate an outcome for the first parcel group based on the output.

The system of the preceding paragraph can include any sub-combination of the following features: where the property-level data includes property data and census data; where the property features for each of the first and second parcel groups includes an aggregation of parcel features for each of the at least one parcels in the first and second parcel groups respectively; where the computer-executable instructions, when executed, further cause the processor to generate a visualization of the embedding vectors; where the artificial intelligence model is selected from the group including an automated valuation model, a rental valuation model, and a neighborhood recommendation model; and where the outcome is selected from the group including a housing value, a rental value, and a recommendation for the first parcel group.

The system of the preceding paragraphs can include the following features: where the computer-executable instructions, when executed, further cause the processor to: obtain a neighbor predicting artificial intelligence model; generate an embedding function using the property features and the graph model as an input to train the neighbor predicting artificial intelligence model; determine a neighbor score between the first and second parcel groups corresponding to the property features; and generate the embedding vector for the first parcel group by inputting into the embedding function the property features of the first parcel group and, if the neighbor score meets a neighbor threshold, the property features of the second parcel group.

The system of the preceding paragraphs can include any sub-combination of the following features: where the computer-executable instructions, when executed, further cause the processor to obtain an encoded identification of the at least one parcels; where the embedding vectors includes a dimensionally reduced vector of the first and second parcel groups, and wherein a dimension is encoded with the property feature of the first and second parcel group; and where the embedding vectors includes 32-dimensions.

Another aspect of the disclosure provides a non-transitory, computer-readable medium comprising computer-executable instructions for generating a graph model, wherein the computer-executable instructions, when executed by a computer system, cause the computer system to: obtain a geographic unit grouping, wherein the geographic unit grouping includes a first parcel group and a second parcel group, wherein the first parcel group includes at least one parcel; obtain property-level data for the first and second parcel groups in the geographic unit grouping; generate a graph model using the property-level data, wherein the graph model indicates a relationship between a geographic area of the first parcel group and a geographic area of the second parcel group; generate property features for each of the first and second parcel groups using the property-level data; generate an embedding vector for each of the first and second parcel groups using the property features and the graph model; apply the embedding vectors as an input to an artificial intelligence model, wherein application of the embedding vectors as the input to the artificial intelligence model causes the artificial intelligence model to produce an output; and generate an outcome for the first parcel group based on the output.

DETAILED DESCRIPTION

Introduction

Figure 1:
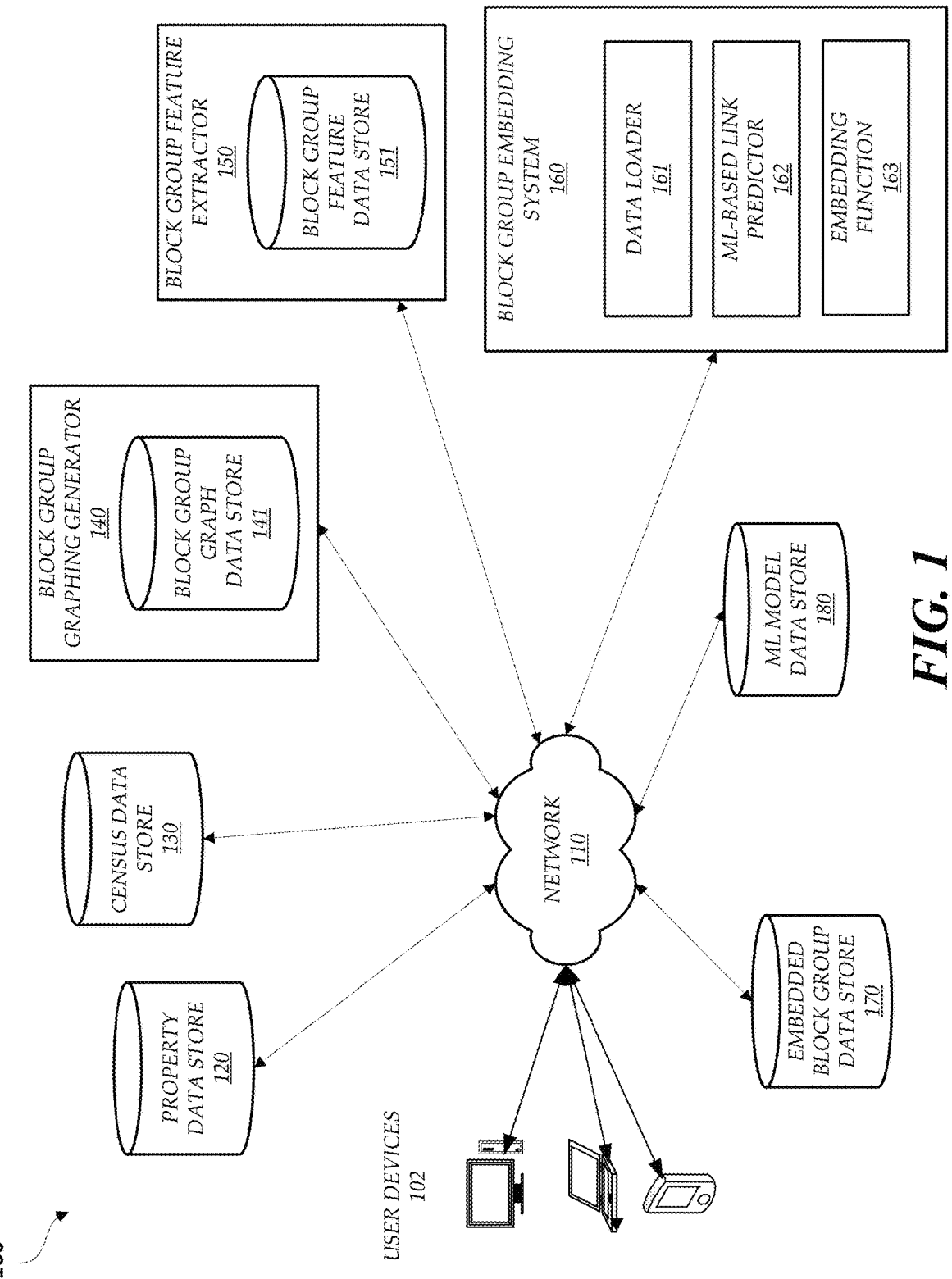
FIG. 1 is a block diagram of an illustrative operating environment.

For various purposes, decreasing computational processing requirements for grouping geographical units is desirable. Conventional methods may utilize geographical units' statistics, trends, and spatial information to group geographical units. Still, these conventional methods may not be able to handle the computational processing requirements when there are large volumes of data for the geographical units. For example, home price prediction algorithms, such as those implemented by automated valuation models (AVMs), commonly rely on the statistics, trends, and/or spatial information of geographical units to predict the value of a home or parcel. AVMs can dynamically calculate a property valuation based on available local market data on the property and similar properties at that point in time. AVMs, such as those implemented with artificial intelligence models, can be used to determine the collateral worth of a mortgage secured by a consumer's principal dwelling. In some instances, AVMs can be used in lieu of or in conjunction with a traditional appraisal.

Using AVMs commonly involves obtaining a sufficient public record of a geographic unit to train the AVMs for accurate and reliable performance. Incorrect or insufficient public records may lead an AVM to differ exponentially from traditional appraisals. In contrast, proper public records may capture additional aspects of properties, such as individual amenities like viewpoints or beautification improvements, that can help the AVM provide results comparable to traditional appraisals. Although public records exist, the number of geographic units with available public records can be expansive, and it may be computationally expensive to attempt to train AVMs with the volume of data that may be available. Reducing the number of geographic units or otherwise reducing the amount of data used to train an AVM may reduce the computational expense of the training. However, conventional methods to reduce the training data size or to group geographic units together often produce inconsistent results due to data loss in training the model and/or the introduction of unintended comparisons between geographic units in the public data.

The lack of processing capabilities to train an AVM when there are many geographic units can be a concern because a useful form of public records on geographic units are those categorized by the U.S. Census Bureau. The geographic units defined by the U.S. Census Bureau provide accurate and detailed public records that could decrease the need for traditional appraisals.

As described above, the U.S. Census Bureau categorizes properties in geographic units such as but not limited to individual properties, blocks, block groups, tracts, zip codes, metropolitical divisions, metropolitan statistical areas, and states. Although each geographic unit can be useful, block groups and tracts can be particularly useful for AVMs. A census tracts represent the smallest territorial entity that population data is available. Census tracts are designed to be relatively homogeneous units concerning population characteristics, economic status, and living conditions, averaging populations of about 4,000. A census block is the smallest geographical unit for the tabulation of 100 percent of data collected from all houses rather than samples of houses. A census block group (which may also be referred to herein as a parcel group) is a geographical unit between the census tract and the census block. Typically, census block groups have a population of 600 to 3,000 people, are roughly 50 blocks per block group, and are all census blocks with the same first digit of a three-digit block code within a given census tract. The census block group may be the smallest geographical unit for which the U.S. Census Bureau publishes sample data.

However, the number of census block groups may be large (e.g., there may be about 215,000 block groups in the U.S.) Conventional methods to reduce the size or number of block groups when training an AVM can produce inconsistent and/or inaccurate results. For example, reducing the size or number of block groups may result in the AVM training with data that indicates that geographic units of widely ranging characteristics are related or neighbors. As mentioned above, conventional systems that train AVMs typically do not have the processing capabilities to effectively and accurately handle high amounts of geographic unit data points. The block groups can be considered categorical data that may not be directly processable as raw data in a conventional AVM. Although some algorithms may be able to operate directly with categorical data, many conventional artificial intelligence models (e.g., a machine learning model, a neural network, etc.), such as AVMs, may not directly operate on the labeled categorical data. Therefore, the conventional artificial intelligence model may instead require numeric input and output variables.

To effectively implement data in an artificial intelligence model, the system can first convert the categorical data to a numerical form and, after processing through the artificial intelligence model, reconvert the numerical outputs back to categorical data. Conversion can involve both integers encoding and one-hot encoding. Integer encoding can assign an integer value to each unique categorical value. These integer values can have a natural ordered relationship, which, dependent on the directive of the artificial intelligence model and the type of categorical data, could be useful or harmful to the intended output. In addition, categorical data can be either ordinal or nominal. Ordinal data can include categories that do not intrinsically contain a rank but could be useful from a natural ordered relationship, such as converting test grades from A through F to 6 through 1.

On the other hand, unintentional natural ordered relationships can harm nominal data. One technical drawback could be that a trained artificial intelligence model may improperly assume that categories ranked higher in an unintended natural ordering are more important instead of considering each category equally. As a result, unintended natural ordering could lead to the trained artificial intelligence model exhibiting poor performance or unexpected results, which may include outputting predictions halfway between categories. For example, a class of colors could include red, blue, and yellow that, when converted to integers, could be red equals "1," blue equals "2," and yellows equals "3." However, this could create a natural numerical ordered relationship that may not be intended to exist within this category. As a result, the trained model may improperly assume that yellow has more importance than red due to the numerical ordering.

To avoid having a trained artificial intelligence model produce poor or unexpected results due to unintended natural ordering learning, the integer representations could be converted to a one-hot encoding before training the artificial intelligence model. One-hot encoding of values can be represented as a series of bits representing a category or integer. One-hot encoding may follow these rules: the number of bits equals the number of distinct categories, where a single "1" bit represents the intended category, and all other bits are "0." In the color example above, three bits may be used to represent a different color. In this example, red can equal "001," blue can equal "010," and yellow can equal "100." This example could be depicted as three sets of data, each with three dimensions corresponding to the three bits. In some embodiments, the system can use dummy variable encoding instead of or in conjunction with one-hot encoding. In some alternative embodiments, the system can use count/frequency encoding or weight of evidence encoding.

Regarding block groups as categorical data, the block groups can be considered nominal categories because any given block group is not necessarily more or less important than any other block group. As a result, each block group may could be one hot encoded rather than integer encoded. However, applying one-hot encoding to each block group could result in a large number of bits being used to represent the block groups (e.g., 215,000 bits if the block groups as a whole cover the U.S. since there are approximately 215,000 block groups categorized in the U.S.). Thus, although one-hot encoding can reduce issues like unintended natural ordering, applying one-hot encoding may increase the number of dimensions in the data. Increasing the number of dimensions in the data may introduce new technical issues, such as creating too many predictors related to each unique category.

Another technical deficiency of current model training systems can be multicollinearity between independent variables that could reduce the accuracy of the trained artificial intelligence model. Multicollinearity, for example, can lead to overfitting in a regression-based artificial intelligence model that leads to excess, unwanted noise. Regarding AVMs, the high number of dimensions that may represent the block groups could result in a noisy output with inaccurate estimates.

Accordingly, one solution may be to reduce the number of dimensions created during one-hot encoding by creating low-dimensional embedding vectors for each block group. Features or attributes associated with the block groups and/or the average features or attributes associated with the properties within a block group could be used by a system described herein to reduce the dimensions while still retaining the characteristics of the block groups. For example, by narrowing the dimensions to certain features or attributes of the block groups or groupings of features, the system described herein may reduce the number of dimensions in each block group to a lower number of dimensions by 1, 2, 3, 4, 5, 6, etc. orders of magnitude (e.g., from 215,000 dimensions to 2, 4, 8, 10, 16, 32, 35, 50, 100, 1000, etc. dimensions). The system described herein can input property data related to the block groups (e.g., public and/or non-public property data) to a component that obtains aggregate features or attributes from some or all properties in each block group. In some embodiments, the system described herein can process data related to the spatial information about each block group to form a network graph to determine whether block groups are neighbors or intersect. The system described herein may apply the features or attributes as an input to a trained artificial intelligence model (e.g., a machine learning model, a neural network, etc.), which may cause the trained artificial intelligence model to develop an embedding function to reduce the block group dimensions. The trained artificial intelligence model may develop the embedding function by predicting if nodes representing block groups have a connection based on each block group's features or attributes. In some embodiments, the system described herein can also input the network graph with the block group features or attributes to the trained artificial intelligence model to increase the optimization for the node connection predictions, which may cause the trained artificial intelligence model to develop a more precise embedding function. After the artificial intelligence model learns the embedding function, the system described herein can apply features or attributes of the nodes and/or the feature or attribute of neighboring nodes as an input to the embedding function to derive an embedding vector for each block group.

After the embedding vectors are derived, the system described herein can use the embedding vectors for increased accuracy in functions to determine qualities related to outcomes on the block group, such as valuations or recommendations. Furthermore, rather than only reducing the high number of dimensions related to block groups, the system described herein can embed features or attributes into the vector for each block group through a dimensional reduction in the embedding function. In some embodiments, the system described herein can use the embedding vectors to compare whether two block groups have any similarities through the embedded features or attributes, such as through cosine similarity. In such embodiments, the system can provide a neighborhood recommendation, such as identifying block groups that are most similar to a specified block group. In another embodiment, the system described herein can use the block group embedding vectors directly in AVMs or any other downward artificial intelligence model, such as a rental valuation model. For AVMs, the block group embedding vector could help with issues present when inputting the block group nodes directly, such as but not limited to noise, multicollinearity, and/or inaccuracy in predictions. For AVMs, the system can use the embedding vectors as inputs to generate a housing value for one or more of the block groups. For rental valuation models, the system can use the embedding vectors as inputs to generate a rental value for one or more of the block groups. In another embodiment, the system described herein can confirm the accuracy of the block group features using an automated validation model.

Although this disclosure refers to dimensional reduction due to the high number of dimensions related to census block groups, this is not meant to be limiting. For example, the system described herein can perform dimensional reduction in relation to any grouping of parcels (e.g., states, counties, cities, towns, zip codes, neighborhoods, tracts, states, etc.). In particular, the techniques disclosed herein can apply to any grouping of parcels and any type of spatial data.

The foregoing aspects and many of the attendant advantages of this disclosure will become more readily appreciated as the same becomes better understood by reference to the following detailed description when taken in conjunction with the accompanying drawings.

Example Block Group Dimensional Reduction Environment

FIG. 1 is a block diagram of an illustrative operating environment 100 in which the block group embedding system 160 uses intermediary data gathered from a block group graphing generator 140 and block group feature extractor 150 to create an embedding vector for each node of property data store 120. The block group graphing generator 140 and block group feature extractor 150 derive data for the block group graph data store 141 and block group feature data store 151, respectively, from the data first obtained in the property data store 120 and census data store 130. The data in the property data store 120 and the census data store 130 can be considered property-level data, such as but not limited to MLS data, appraisal data, web traffic (e.g., Internet or other network traffic), user search history, and mortgage records. These initial data repositories (e.g., property data store 120 and census data store 130) can contain data for some or every parcel in some or every parcel group (e.g., census block group) within the relevant geographic unit grouping. For example, a relevant geographic unit grouping can be a census tract containing each census block group within the census tract (e.g., a first block group, a second block group, a third block group, a $215,000^{th}$ block group, etc). In some embodiments, the initial data repositories can contain data for multiple geographic unit groupings. To generate the embedding vectors, the block group embedding system 160 can cluster or group "similar" census block groups as neighbors based on the similarity between the block groups' corresponding property features. Similar to each block group in the geographic unit grouping having an encoding for identification of that particular block group (e.g., one-hot encoding), the block group embedding system 160 may assign a unique ID to each block group and maintain a mapping that maps specific census block groups to their respective IDs.

The operating environment 100 includes a network 110 for communication between the data repositories (e.g., property data store 120, census data store 130, block group graph data store 141, block group feature data store 151, embedded block group data store 170, ML model data store 180, etc.) with the block group graphing generator 140, block group feature extractor 150, and block group embedding system 160. In addition, the block group graphing generator 140 generates data for the one or more block group network graph data stores 141 included within by communicating with the census data store 130 via the network 110. The one or more block group graph data store 141 containing data that can include mappings or correlations that indicate the relationships between the geographic areas of each block group in the geographic unit grouping. Similarly, the block group feature extractor 150 includes one or more block group feature data stores 151, with the data generated by communicating with the property data store 120 and the census data store 130 via the network 110. The data in the one or more block group feature data store 151 can include aggregate feature data for each block group in the geographic unit grouping. The block group embedding system 160 may communicate via the network 110 with the block group network graph data 141 and the block group feature data 151 for embedding the block group nodes from the property data store 120. The block group embedding system 160 may process the data from the intermediary data repositories (block group graph data store 141 and block group feature data store 151) through a data loader 161 to produce data that the block group embedding system 160 can input into an embedding function 163. In some embodiments, the intermediary data is processed by an ML-based link predictor 162 using an artificial intelligence model (e.g., a machine learning model, a neural network, etc.) to produce the embedding function 163. The embedding function 163 can generate an embedding vector for each block group, which can be stored in an undepicted data repository. In some embodiments, the block group graphing generator 140 and block group feature extractor 150 can transmit the obtained data to an external data repository via the network 110 instead of storing the data locally in memory. In some embodiments, the block group embedding system 160 can store the derived data locally in memory instead of transmitting the data to an external data repository via the network 110. Furthermore, the operating environment 100 includes various user devices 102 that may communicate with the block group graphing generator 140, block group feature extractor 150, block group embedding system 160, or any of the data repositories (e.g., property data store 120, census data store 130, block group graph data store 141, block group feature data store 151, the undepicted embedding vector data repository, etc.) to provide data related to the block groups, such as but not limited to raw property data, property data derived from raw property data, graphs of said forms of property data, embedded forms of the property data, and/or graphs of said forms for embedded property data. For example, a user can use a user device 102 to access graphs of property data, such as via a user interface displayed by a mobile application running on the user device 102. Furthermore, the embedding vectors can be accessed by one of the user device 102. The user device 102 or the block group embedding system 160 can generate a housing value for any particular block group by inputting one or more of the embedding vectors into a valuation artificial intelligence model. In some embodiments, the valuation artificial intelligence model can be an automated valuation model or any other artificial intelligence model described herein to determine or compare housing values of the block groups. The housing values, a visualization of the housing values, or a visualization of the embedding vectors can be displayed on one or more of the user devices 102.

The operating environment 100 may be a single computing device or include multiple distinct computing devices, such as computer servers, logically or physically grouped together to operate collectively as a server system. Similarly, the block group graphing generator 140, block group feature extractor 150, and block group embedding system 160 may be a single computing device, each may be a single computing device, or each may include multiple distinct computing devices, such as computer servers, logically or physically grouped together to operate as a server system collectively. The components of the operating environment 100 can each be implemented in application-specific hardware (e.g., a server computing device with one or more ASICs) such that no software is necessary or as a combination of hardware and software. In addition, the modules and components of the operating environment 100 can be combined on one server-computing device or separated individually or into groups on several server-computing devices. In some embodiments, the operating environment 100 may include additional or fewer components than illustrated in FIG. 1.

In some embodiments, the block group embedding system 160 may implement the features and services provided by operating environment 100 as web services consumable via the network 110. In further embodiments, one or more virtual machines implemented in a hosted computer environment can provide the operating environment 100. The hosted computing environment may include one or more rapidly provisioned and released computing resources, which computing resources may include computing, networking, and/or storage devices. A hosted computing environment may also be referred to as a cloud computing environment.

Property-Level Data

As illustrated in FIG. 1, the operating environment 100 includes the block group feature extractor 150 that receives property-level data from one or more data repositories and derives features relevant to a census block group. This property-level data can include data in the property data store 120 and census data store 130, each containing property data from one or more data sources. Similarly, the block group graphing generator 140 in the operating environment 100 receives property-level data to generate a network graph of the census block groups. Again, the property-level data may include the property data store 120 or the census data store 130 that may include, for example, any one or more of the following MLS (Multiple Listing Service) data, appraisal data (e.g., appraisal reports), mortgage records, House Parcel data, homeowner demographic data, and county assessor and recorder data (as aggregated and maintained by private records).

The property data store 120 may store property data associated with one or more structures on one or more parcels, including the one-hot encoding for the block groups. The real estate property data in the property data store 120 can include features of a structure, which can include the number of bedrooms in the structure, the number of bathrooms in the structure, and/or other enriched data elements (e.g., bathroom distance to a bedroom on a same floor, bathroom distance to a bedroom on a different floor, whether the structure includes an open floor plan, bedroom size, bathroom size, whether the closet is a walk-in closet, whether the floor is furnished, etc.). In some embodiments, there can be data on over 100 million parcels. The property data store 120 can be the aggregation of the data for a particular geographic unit within a grouping of larger parcels. The grouping of larger parcels contains each relevant geographic unit that the system may compare. For example, the property data store 120 can be data aggregated for relevant block groups, including all block groups within a tract, a state, nationwide, or any grouping of parcels larger than the block group. Thus, where the geographic unit is a census block group, and all census block groups across the U.S. are relevant, the property data store 120 could contain 215,000 nodes of data, with each node containing the aggregate data of the property data associated with each parcel of the respective block group.

Additionally, property data can include statistics, demographics, and characteristics of each parcel. Statistics of a geographical unit can include characteristics of the geographical unit itself, demographic, average characteristics of residential units, and trends. The characteristics of a geographical unit can include area, square footage, lot size, house style, property style, etc. The demographics can include population, number of residential units, and number of multifamily units. The average characteristics of residential units can include rooms, beds, building square footage, air conditioning, fireplaces, attics, bathrooms, full bathrooms, pools, basements, building condition, building quality, type of construction, type of exterior walls, property type, roofing material, roof structure, sewage connections, architectural style, subdivisions, water connections, flood risk, natural hazards, privacy scores, backyard viewing, backyard exposure, the year the property was built, HOA, zoning regulations, nearby schools, quality of nearby schools, and lot size. In some instances, the property data can include web traffic, such as the number of times a property is searched or viewed, and user search history, such as the patterns and timing that a user views a property in comparison to another property. In some embodiments, the property data can include multiple listing service (MLS) data that may not be available in county record databases. Property data can also include the history of all past transactions for each parcel or structures on one or more parcels. This history of past transactions can be referred to as value history. The block group embedding system 160 can represent MLS data as a wide variety of subject and comparable property data, including but not limited to property characteristics, listing prices, days on the market, and sales pricing. The block group embedding system 160 may use MLS data with or without a property's actual purchase or sale price.

The census data store 130 may similarly store property data associated with one or more structures on one or more parcels, including the one-hot encoding for the block groups. Similarly, census data can be the aggregation of data for real estate properties within a particular geographic unit, such as a block group. The census data store 130 can contain each aggregated block group data collected by the U.S. Census Bureau nationwide. Alternatively, the census data store 130 can contain block group data that is also in the property data store 120, and vice-versa. Data stored in the census data store 130 and the property data store 120 may not be mutually inclusive and, in some instances, the data may be stored together. For example, data related to MLS data, appraisal data, web traffic, and user search history may be stored in one or both of the the census data store 130 and the property data store 120. Although census data may contain similar data as property data, census data shows spatial information about the block group and polygon, size, and topography. For example, census data include information such as but not limited to latitude, longitude, geometry, area, and water of the block group. In another example, web traffic data and user search history can include information on how block groups compare to each other based on frequencies and timing of users searching for different parcels or block groups. In some embodiments, the census data can include geographic unit-level information, such as block groups. In addition, the census data may contain information such as but not limited to population or economics. Using census data can be more effective in aligning groups of parcels and property data because census data is a government created and is more likely to align with defined groups. For example, neighborhoods are less defined. Although neighborhoods can be defined by certain characteristics, such as whether two properties fall within the same HOA, neighborhoods may not be definite, there may not be a suitable underlying characteristic to group parcels together under.

On the other hand, a census block group is a predefined grouping determined by the government, the smallest geographic entity that the decennial census tabulates and publishes sample data about. Additional features used to determine census block boundaries include but are not limited to historical block boundaries, water areas such as double-line drainage, named and addressable divided roads, named and addressable undivided roads, unnamed and addressable divided roads, unnamed and addressable undivided roads, other addressable features, feature extensions, statistical or governmental unit boundaries from the 1980s, main rail line features, railyards, rail spurs and other rail features, named perennial streams such as single-line drainage, power transmission lines, pipelines, unnamed perennial streams such as for single-line drainage, named perennial or unclassified canals, named perennial or unclassified ditches, named perennial or unclassified aqueducts, unnamed perennial or unclassified canals, unnamed perennial or unclassified ditches, unnamed perennial or unclassified aqueducts, named intermittent streams or washes, named braided streams, unnamed braided streams, named intermittent canals, named intermittent ditches, named intermittent aqueducts, topographic features such as bluffs or cliffs, fence lines, point-to-point lines, feature extensions that are not manually inserted extensions, other special transport features, or other physical features. In addition, blocks can be grouped as block groups based on the size of adjoining potential census block polygons and the type of bounding features.

Example Block Diagram for Dimensional
Reduction Embedding for Parcel Groups

Figure 2:
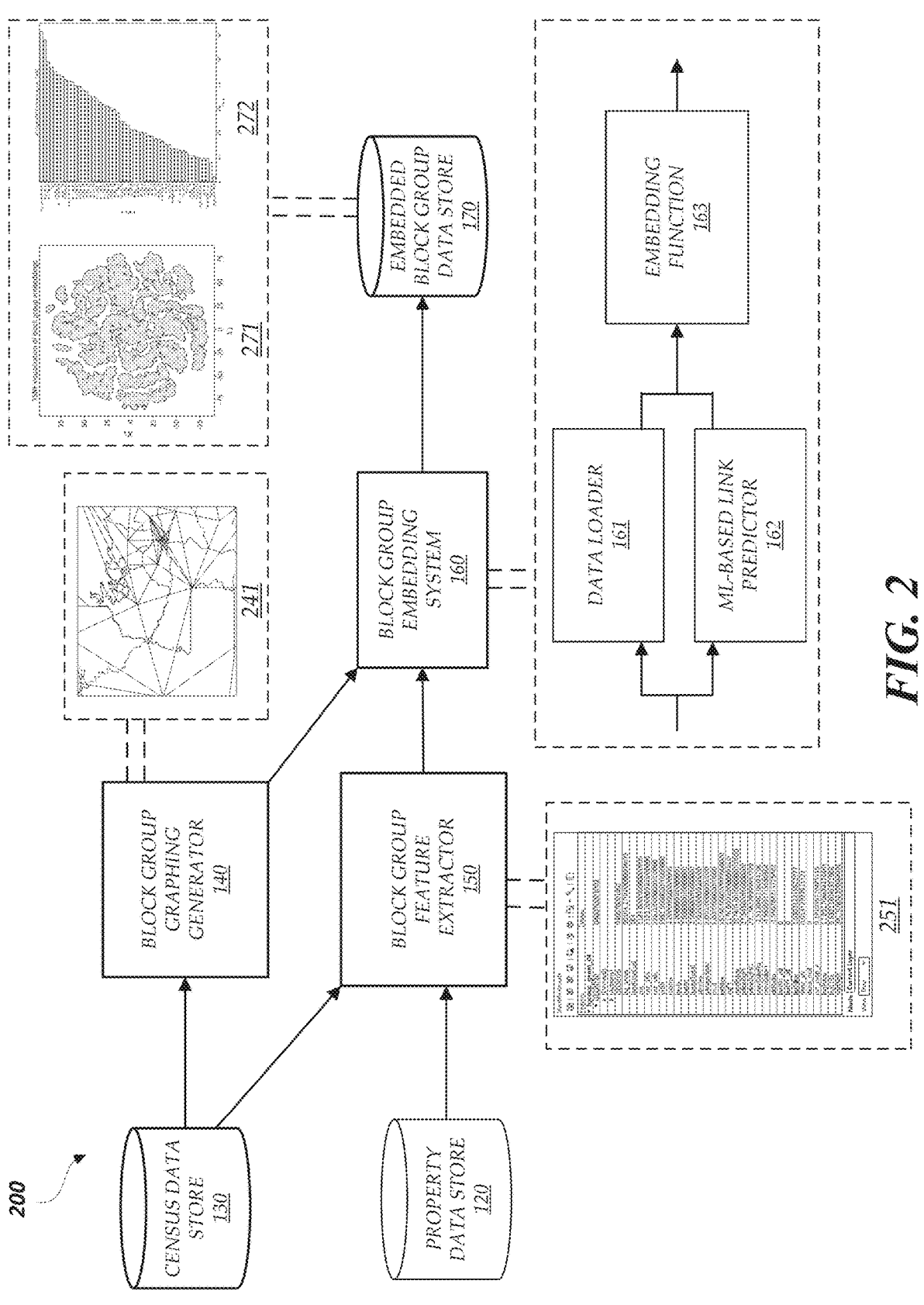
FIG. 2 is a flow diagram illustrating the operations performed by the components of the operating environment of FIG. 1 to reduce the dimensions associated with large groupings of parcels, such as census block groups, into vectors embedded with property features.

FIG. 2 is a flow diagram illustrating the operations performed by the components of the operating environment of FIG. 1 to reduce the dimensions associated with large groupings of parcels, such as census block groups, into vectors embedded with property features. As illustrated in FIG. 2, the block group feature extractor 150 can analyze property-level data from the property data store 120 and census data store 130 to extract features for each block group by taking the aggregate of the parcels or properties in the block group. Thus, the aggregate of properties in the block group can be considered a unit of aggregation. As described above, the techniques disclosed can be applied to any grouping of parcels. Thus, a unit of aggregation could be groupings such as but not limited to a hexagon grid system, census tract, neighborhoods, and builder-defined divisions. Using the block groups as a unit of aggregation, relationships between properties can be calculated using various similarity measurements regarding features or "distance." Once the block group embedding system 160 calculates property similarity/distance values, the block group embedding system 160 can use one or more clustering algorithms to perform aggregation. For example, aggregating a block group could involve obtaining features for all parcels within the block group and taking the average value of the features as the aggregated features for the block group. In some embodiments, the block group embedding system 160 may weigh certain features unequally, or the aggregated value of features can be determined using an adjusted algorithm to average the values of the relevant parcels. As one example, the block group feature extractor 150 may include an image analysis component that analyzes property images (e.g., as obtained from MLS records, appraisal reports, web searches, etc.) to identify the characteristics and conditions of houses. Various algorithms for detecting property characteristics and conditions from image data may be used for this purpose. As another example, the block group feature extractor 150 may use a text analysis algorithm (e.g., text classification, categorization, clustering, topic modeling, thematic analysis, text mining, tokenization, intuitive semantics, etc.) to extract, from MLS listings, keywords and phrases descriptive of property characteristics and conditions. As another example, the block group feature extractor 150 may determine features of a property based on related web traffic between the property and other properties, such as by parsing the metadata.

The block group graphing generator 140, illustrated in FIG. 2, may obtain data from the census data store 130 to form a graph depicting a network of block groups. In some embodiments, the user device 102 can access the graph depicting a network of block groups via communication through the network 110 to depict a block group network graph 241. The block group graphing generator 140 derives the block group network graph 241 by utilizing the data in the census data store 130, such as each block group's geometry, latitude, and longitude. In some instances, the block group graphing generator 140 can supplement the block group data collected by the U.S. Census Bureau with other property data, such as maps, appraisal data, and web traffic data, or in other instances, form the graph without any block group data collected by the U.S. Census Bureau. In such instances, the block group graphing generator 140 can analyze the property data to determine the relationship between different block groups. For example, two block groups may be considered related if users search for properties within both block groups because the users assumably believe properties in those block groups are comparable. Similarly, block groups with similar aggregate appraisal values may be considered related. The block group graphing generator 140 determines whether two block groups are neighbors or intersect with each other to form polygons or centroids between block groups, as depicted in the block group network graph 241. In some embodiments, the block group graphing generator 140 maps triangular polygons based on the block groups, which the block group embedding system 160 can depict as human-defined polygons in the census data store 130. The block group network graph 241 illustrates an example of a block group outlined as a human-defined polygon with a node at the center that connects this block group with other block groups through triangular polygons. A triangular grid system can produce regular, non-subjective base units, unlike human-defined polygons. To determine whether block groups are neighbors, the block group graphing generator 140 or a user via a user device 102 can use spatial touch functions to connect block groups. The block group graphing generator 140 or a user via the user device 102 can create a buffer for each block group to determine whether two block groups intersect as neighbors.

As further described below, once the block group graphing generator 140 and block group feature extractor 150 derive a block group network graph 241 and block group aggregate features 251 for each block group, the data can be fed into the block group embedding system 160 to embed each block group into lower dimension embedding vectors. The block group embedding system 160 can utilize an ML-based link predictor 162 comprising an artificial intelligence model to train an embedding function 163. The ML-based link predictor 162 can use the extracted features from the block group feature data store 151, along with the block group network graph data 141 (such as property locations, sale prices, zip codes, web traffic, etc.), to predict the relationship between block groups and predict whether block groups are neighbors. The ML-based link predictor 162 optimizes the embedding function 163 to embed each block group node with its features and reduce the dimensions for each node. After the block group embedding system 160 constructs the embedding function 163, a data loader 161 can classify nodes of block groups according to their features and categorize nodes as neighbors of other nodes. A node's and neighboring node's features can be fed into the trained embedding function 163 to derive an embedding vector for that node. The embedding function 163 can derive an embedding vector for each node using this process.

Uses for Embedding Vectors

As illustrated in FIG. 2, after the embedding function 163 converts each block group into an embedding vector, the block group embedding system 160 can store the embedding vector of each of the 215,000 block groups in an embedded block group data store 170. Then, a visualization of the embedding vectors can be graphed for a user and displayed by the user device 102 via the network 110. For example, the block group embedding system 160 can graph the block groups embedded into a 2-dimensional vector using a T-distributed Stochastic Neighbor Embedding (TSNE) as an embedded 2-D block group graph 271. The embedded 2-D block group graph 271 can provide a user with an illustration of how to arrange the block group data in a high-dimensional space in a two-dimensional mapping. In some embodiments, the TSNE visualization can apply to 3-D embedding vectors or even higher dimensions by aggregating the features into two or more compiled features.

In some embodiments, the block group embedding system 160 can use the embedding vectors to increase accuracy in functions to determine qualities related to outcomes related to the block group, such as valuations or recommendations. As an illustrative example, the block group embedding system 160 can use two price models to estimate property values: linear regression and XGBoost. XGBoost may incorporate various additional data as compared to linear regression. Alternatively, the block group embedding system 160 can use other gradient-boosting algorithms and software packages instead of XGBoost. The block group embedding system 160 can use real transaction data and the above price models to predict prices. The metrics that can be calculated for these price predictions are: Percent Predicted Error with 10% (PPE10), for which higher values are better, and Median Absolute Percentage Error (MAPE), for which lower values are better. In another embodiment, the downward artificial intelligence model could be an automated validation model. In one such embodiment, the block group embedding system 160 can feed the embedding vectors into linear and XGBoost models for each block group to measure their accuracy, allowing the block group embedding system 160 to assess their quality objectively. In some embodiments, the block group embedding system 160 can use the embedding vectors to compare whether two block groups have any similarities through the embedded features, such as through cosine similarity by comparing the angles between the embedding vectors. In such embodiments, the block group embedding system 160 can include a neighborhood recommendation model to compare the block groups and provide recommendations for any particular block groups. The recommendation can provide a ranking of recommended block groups, such as a single most recommended block group, the top two most recommended block groups, the top five most recommended block groups, the top ten most recommended block groups, etc.

In another embodiment, the block group embedding vectors could be fed directly into AVMs or any other downward artificial intelligence model, such as a rental valuation model. For either model, the block group embedding vector reduces issues when inputting the one hot encoded nodes directly, such as but not limited to noise, multicollinearity, and/or inaccuracy in predictions. For example, the block group embedding system 160 can generate an embedded block group AVM graph 272 by inputting the embedding vectors into the AVM. The embedded block group AVM graph 272 could be provided to a user through a user device 102 via communication with the network 110. In some embodiments, the embedded block group AVM graph 272 could determine a weighting for features in the valuation.

Some features examined can include but are not limited to census tracts, block groups, lot size, monthly sales, square footage, age of residents, average block group pricing, previous types of sales, street suffixes, house styles, latest conditions, parking distance, number of rooms, number of bedrooms, stories in the houses, garage spaces, number of rooms, land use codes, total bathrooms, number of full bathrooms, quality of houses, swimming pools, fireplaces, airports nearby, noise ordinances, exterior walls, acres of land, land use codes, median price, price per square feet, history of the last year, history of the last 90 years, etc.

In some embodiments, the embedding process 200 can also include a model generator that generates neighborhood-specific AVMs, or neighborhood-specific rental valuation models, for some or all defined neighborhoods. These models can be used to generated outcomes, such as a housing value or rental value of any particular block group. The model generator can use a machine learning process, such as a neural network, a support vector machine, a Bayesian network, a Decision Tree algorithm, and/or the like, to determine correlations between property attributes and property values in the respective neighborhood. Each neighborhood-specific model may be based primarily or exclusively on the property data of the properties within the respective neighborhood. As a result, neighborhood-specific model tend to be more accurate at estimating property values than conventional AVMs or rental valuation models. Each model can include a set of weights that specify amounts of weight to give to particular property attributes in calculating an estimated property value. In some embodiments, the model generator can update the neighborhood-specific models substantially in real-time (e.g., hourly or daily) as new data becomes available on properties within the respective neighborhoods. In some embodiments, the block group embedding system 160 generates, for at least some of the neighborhoods, respective models for estimating the values of properties in such neighborhoods. Each model uses information about the properties in the respective neighborhood to make more accurate predictions of property values. The block group embedding system 160 may update the model substantially in real-time as new information about the properties in the neighborhood becomes available.

In some embodiments, the block group embedding system 160 may also include a query interface that enables users of the block group embedding system 160 to retrieve information about specific properties and/or neighborhoods of bloc groups. For example, in one embodiment, a user, via the query interface, can enter and submit a property address (or other property identifiers). The block group embedding system 160 responds by returning some or all of the following: (1) the unique neighborhood ID of the corresponding cluster of block groups, (2) a map showing the boundary of the cluster, (3) data regarding characteristics of the neighborhood, and (4) the estimated value of the property, as calculated using the AVM or rental valuation model for the respective block group and their corresponding properties. The block group embedding system 160 may also generate an interactive map that enables the user to interactively explore the property value estimates (as calculated with the neighborhood-specific model) of other properties found to be related.

A computer system programmed with executable program modules stored on one or more computer-readable media (hard disk drives, solid-state memory devices, etc.) may implement the embedding process 200. The system's components may be distributed or replicated across multiple physical servers or other computing devices of the computer system, which may or may not be co-located. Each such server typically includes one or more hardware processors that execute program instructions, solid-state memory, a network interface, and various other hardware components. The computer system may, in some embodiments, be a cloud computing system. The functionality of the components of the embedding process 200 may be distributed among software components differently than shown in FIG. 2, and some components and functions may be omitted in some embodiments. For example, the data repositories (e.g., property data store 120, census data store 130, block group graph data store 141, block group feature data store 151, embedded block group data store 170, ML model data store 180, etc.) shown in FIGS. 1 and 2 may include databases, flat file systems, and/or other types of data storage systems. They may use hard disk drives, solid-state memories, and/or other types of non-transitory computer storage devices.

Block Group Data Conversion

Figure 3A:
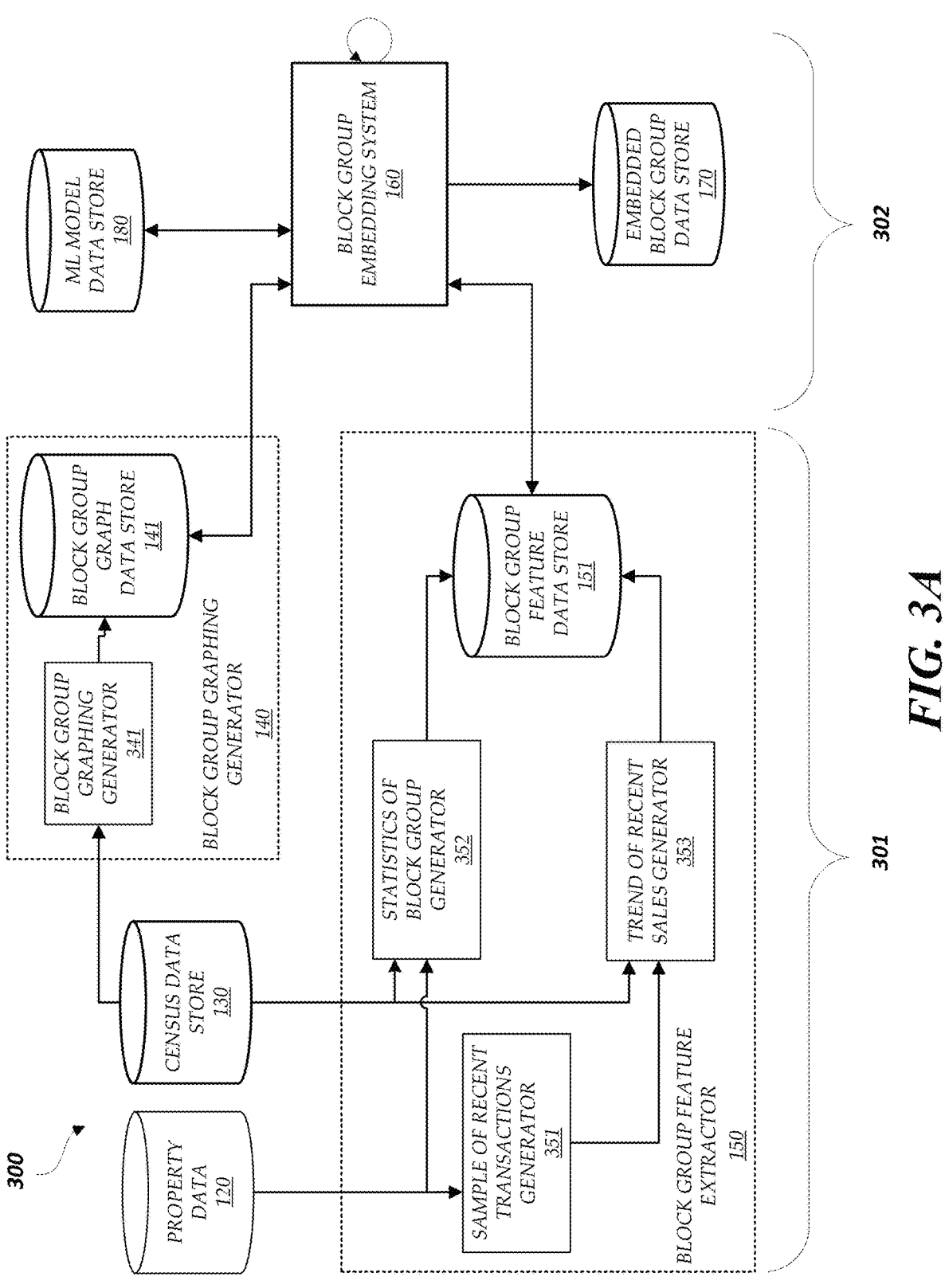
FIG. 3A is a flow diagram illustrating an alternative embodiment for the environment of FIG. 1.

FIG. 3A is a flow diagram illustrating an alternative embodiment for the operations performed by the components of the operating environment 100 of FIG. 1. Similar to FIG. 2, FIG. 3A feeds property data store 120 and census data store 130 into the block group embedding system 300 to reduce the dimensions associated with large groupings of parcels, such as census block groups, into vectors embedded with property features. The block group embedding system 300 may be similar to the block group embedding system 160 of FIG. 1. The block group graphing generator 140 operates as described in FIG. 2, with a block group graphex 341 for the operations and algorithms described above. The block group graph data store 141 stores the graphs and processed data. As described in FIG. 2, the graph can be generated by correlating the geometry of each block group into polygons and/or centroids, that are then mapped together to visually indicate and correlate the relationship between the geographic areas of each block group. A graph neural network framework can implement a projection of the graphs. In order to leverage spatial information, connections and/or links between block groups can be established by the block group graphex 341. If there is a connection between block groups, then these block groups can be considered neighbors. Alternatively, the relationships between block groups can be in-part determined based on similarities between the aggregate of their respective properties, such as by analyzing web traffic and appraisal values. As described in FIG. 2, whether block groups are neighbors can be determined through implementations in the block group graphex 341, such as through spatial touch functions, polygon buffering, and/or identification of the intersections between block groups. The block group graphing generator 140 can also identify a centroid of each merged polygon and any remaining unmerged polygons and create an initial graph model in which each centroid represents a node in the graph model. After enlarging the merged and/or unmerged polygons, the parcel growth prediction system can determine which merged and/or unmerged polygons at least partially overlap. For those merged and/or unmerged polygons that at least partially overlap, the block group graphing generator 140 can connect the centroids of the respective merged and/or unmerged polygons. Connecting the centroids modifies the graph model to include connections between nodes representing the centroids of merged and/or unmerged polygons that at least partially overlap.

The block group feature extractor 150 operates similarly to the block group feature extractor 150 described in FIG. 2 to extract features in each block group, such as those contained in metadata associated with each block group. The block group feature extractor 150 can extract features by feeding data from the property data store 120 and census data store 130 through algorithms to determine a sample of recent transactions 351, statistics of block groups 352, and trends of recent sales 353. The statistics of block groups 352 can be compilations of data generated for public and non-public data on the block groups from the data on block groups in the property data store 120 and census data store 130. The statistics of the block groups 352 can contain data such as characteristics of the block group, demographics, average characteristics of residential units, and data described above in both the property data store 120 and census data store 130. The sample of recent transactions 351 can be extracted data from the property data store 120, which the block group embedding system 160 can use alongside data from the census data store 130 to derive trends of recent sales 353. These trends of recent sales 353 can include but are not limited to percent changes from listing, upward or downward trends of sales compared to previous months, long and short-term trends of listings and sales, any recent assessments or valuations based per year, the tax year the assessment was conducted, the amount of taxes owed on the property, the total assessment based on the land and its improvements, and liens or mortgages. For example, by sampling the sample of recent transactions 351 as training data, the block group embedding system 160 can derive trends of recent sales 353. Aside from deriving the trend of recent sales 353 after extracting the sample of recent transactions 351, the order in which the steps of the method are described and illustrated should not be construed as limiting, and it is conceivable that the steps can be performed in varying order. The block group feature extractor 150 can compile the data from generated statistics of block groups 352 and generated trend of recent sales 353 as extracted features of the block groups in the block group feature data store 151. Once the data conversion 301 completes the conversion of the initial data repositories (property data store 120 and census data store 130) to the intermediary data repositories (block group graph data store 141 and block group feature data store 151), the embedding process 302 can derive low dimensional embedding vectors from the high dimension one hot encoding for each of the block groups. The embedded block group data store 170 can store the low dimensional embedding vectors.

Block Group Embedding Process

Figure 3B:
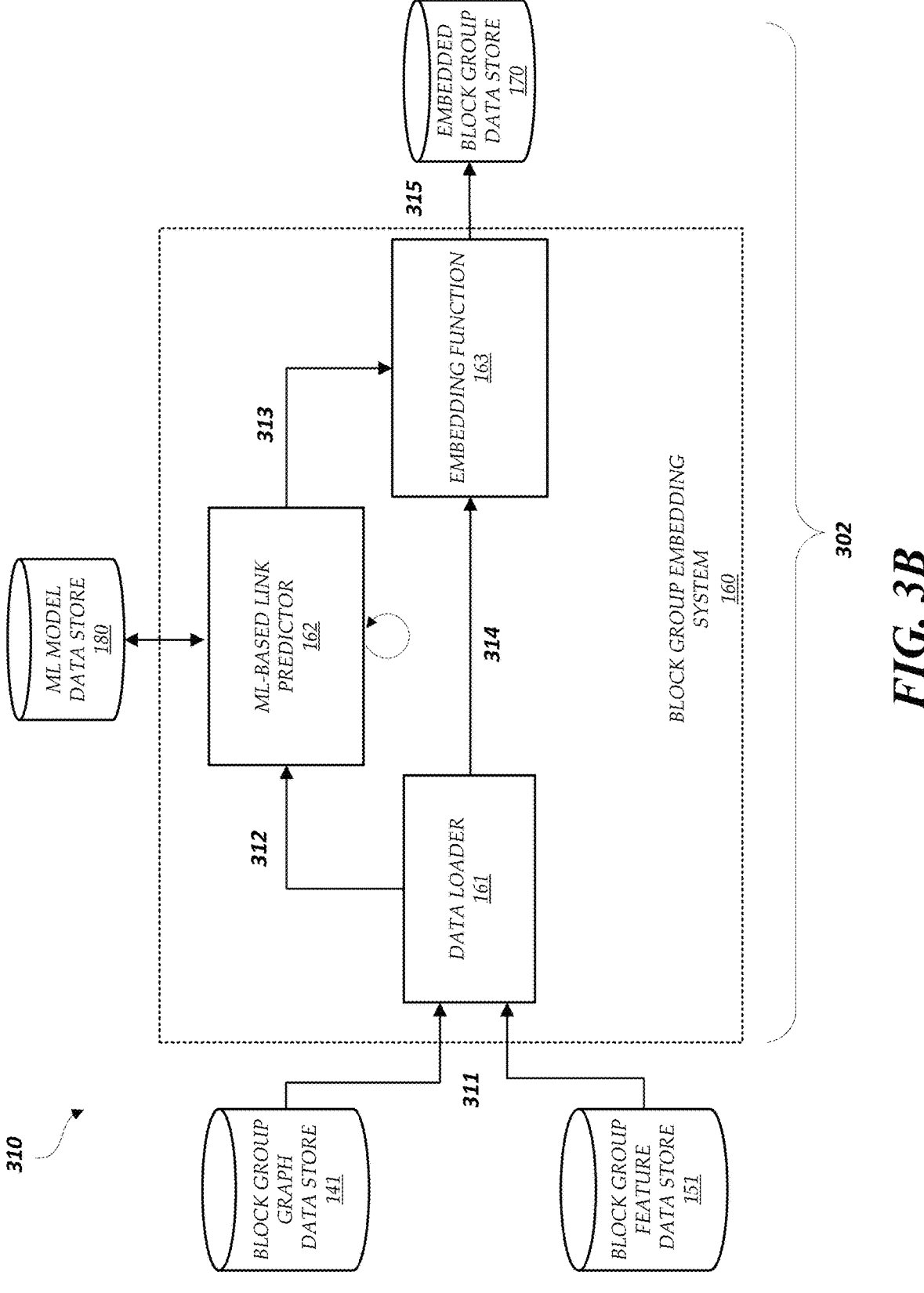
FIG. 3B is a flow diagram illustrating an alternative embodiment for the operating environment of the block group embedding system depicted in FIG. 3A.

FIG. 3B is a flow diagram illustrating an alternative embodiment for the block group embedding system operating environment 310 performed by the block group embedding system 160 depicted in FIG. 3A. Within the block group embedding system 160, the ML-based link predictor 162 can include an artificial intelligence model, such as a graph neural network model using a GraphSAGE framework. GraphSAGE can operate by using a sample of a block group's nodes and neighboring nodes from a graph of the block group nodes to aggregate the features of said nodes, perform aggregation of the features to capture local neighborhood information around each block group, and/or implement supervised or unsupervised learning to generate the embedding vectors. In some embodiments, unsupervised learning can be implemented by the block group embedding system 160 to optimize the an embedding function 163 to preserve the structure of the graph and node similarity. By feeding data into the data loader 161 from the block group graph data store 141 and block group feature data store 151 in step 311, the data loader 161 can conduct a neighboring node sampling to generate sampling neighbors for each node. In some embodiments, the data loader 161 can determine a neighbor score that evaluates the similarity between any two given block groups. For example, the neighbor score can correspond to the degree of similarity between the block group's property features, geographic locations, or any other method or combination of determining connections described herein. In such embodiments, whether any two block groups are considered neighbors, related, or connected can be determined by evaluating the neighbor score, for example, if the neighbor score meets a neighbor threshold. In other embodiments, determining neighbor scores and comparing neighbor thresholds can be combined to simply comparing property features and select the other block groups with the most similar values (e.g., selecting the 50 other block groups in the closest proximity for a particular block group). In other embodiments, the neighbor score can be determined using a mix of property features and can evaluate the similarity using unequal weighting for different property features.

Additionally, the ML-based link predictor 162 can attempt to predict whether nodes representing block groups have a connection based on their features. By inputting data from the data loader 161 in step 312 to train the ML-based link predictor 162, the optimization can be enhanced to improve the accuracy of node connection predictions, hence to develop a more precise embedding function. In some embodiments, step 311 can be skipped, and the block group graph data store 141 and block group feature data store 151 can be directly input into the ML-based link predictor 162. In such embodiments, the data loader 161 can be skipped or incorporated into the ML-based link predictor 162. The training in the ML-based link predictor 162 optimizes this prediction to construct an embedding function 163 in step 313 that can effectively convert the 25,000-dimensional block groups into a lower-dimensional vector embedded with aggregated features of the block groups (e.g., 2, 4, 8, 10, 16, 32, 35, 50, 100, 1000, etc.).

In some embodiments, the input of the ML-based link predictor 162 can be fed forward into one or more neural networks, for example, one, two, three, four, etc. neural networks. The output from the neural networks can be used to generate the embedding functions 163, an objective function such as a graph-based loss function. Training graph-based loss functions can encourage nearby nodes to have similar representations and enforce that the representations of disparate nodes are highly distinct. In some embodiments, the training can include tuning parameters to optimize the graph-based loss function based on shared parameters determined in the neural network layers. To accomplish this process, the ML-based link predictor 162 can predict whether a block group is comparable to another and form a link between the block groups. This link can increase the likelihood that a clustering algorithm can determine the relative similarities of features between block groups. This process can be repeated for each block group. In some embodiments, the links for each feature between each pair of connected block groups can be aggregated and/or combined to generate a normalized score representing a degree of connectivity or similarity between block groups. In some embodiments, this normalization can be a connectivity matrix. Normalization relieves some of the processing restrictions associated with high dimensional inputs by, for example, dividing the number of linkages over the total number of properties in the blocks. In some embodiments, the block group embedding system 160 can feed the connectivity matrix into the clustering algorithm to identify neighboring block groups. Examples of clustering algorithms include but are not limited to, Regionalization, Edge-Ratio Networks, Maximal Entropy, and Graph Theory. A clustering algorithm can, for example, use geospatial operations to determine whether two block groups are neighbors by growing/expanding each block group's geographic boundary. If they touch each other without touching other block groups first, these block groups may be deemed neighbors. The clustering algorithm may group based solely on the strengths of the linkages between them (as represented, e.g., by the normalized scores) or may also consider any one or more other the other similarity features described herein.

This clustering process may be constrained as a result of a contiguous boundary drawn around each block group on a map, with each corresponding block group assigned to each property falling within that boundary. Various clustering algorithms may be used, such as a k-means algorithm, Spectral Clustering, a hierarchical clustering algorithm, a biclustering algorithm, a self-organized map algorithm, a disjoined aggregation algorithm, or a combination thereof. Different amounts of weight may be given to different property features or attributes to calculate degrees of similarity between the block groups. For example, the block group embedding system 160 can give more weight to property location and listing price than, for example, property zip code or property condition. In addition, the block group embedding system 160 may select the weights to emphasize property attributes strongly correlated with property values, such that the block group embeddings are especially useful for predicting property values. In some embodiments, the clustering component gives significant weight to "comparable properties" data obtained from recent appraisal reports (e.g., appraisal reports issued in the last three years), such that the properties with different block groups that the block group embedding system 160 identifies as comparable may have a strong tendency to be grouped as neighbors. In one embodiment, the clustering component uses subject-comp occurrences as simple counts connecting our units of aggregation. Alternatively, the block group embedding system 160 can use more complex representations of the connections through graph Spectral Clustering, a connectivity-based clustering method. Regardless of the particular clustering algorithm used, the algorithm can treat the count of how many times two block groups have been designated as comparable to measure the similarity or relationship between these properties. The clustering algorithm may give more weight to more recent data, such as trends of recent sales 353, such as by applying an age-based decay factor during the counting process.

In step 314, the data loader 161 prepares the property-level data for input into the embedding function for prediction. The neighborhood node sampling from the data loader 161 can reduces the number of inputs for the embedding function. For example, rather than inputting all 215,000 nodes of the block group into the embedding function for each block group, the data loader 161 can reduce the number of inputs for each block group to the block group node and neighboring block group nodes (e.g., 5, 10, 25, 50, 100, 250, 500 or more neighbors). After sorting each block group with their neighbors, the categorized block groups produced by the data loader 161 can be fed into the embedding function 163 in step 314. The embedding function 163 can then process the features in the block group nodes and neighboring block group nodes to reduce the dimensions to produce an embedding vector that has embedded the relevant features for each block group into said dimensions. For example, if the embedding process reduces the dimensions to 32 features (e.g., 32-dimensions), the initial matrix of the one-hot encoding for the 215,000 block groups would transform from 215,000×215,000 to a matrix of embedding vectors with the size 215,000×32. In such an example, each of the 32 dimensions can correspond to the same property feature in each of the 215,000 block groups. The values of each dimension can correspond to how the embedding function 163 was trained to interplay the nodes of the block groups, their features and their neighbors' features, the training data, the algorithms implemented, the hyperparameters provided during training, and/or other factors. As disclosed above, the number of dimensions can shift the values embedded into the vectors. For example, the $1^{st}$ dimension of a 32-dimension embedding vector may not be the same value as the $1^{st}$ dimension of a 24-dimension embedding vector even if both dimensions represent the same block group. This is because the embedding function 163 can develop a different algorithm to compress the property-level features of a parcel group into different numbers of dimensions. The embedding function 163 prepared by the ML-based link predictor 162 can introduce the features relevant to a block group into the embedding vector with values of said features respective to the other block groups. The embedding vector, or dimensionally reduced vector, can identify the features of the block group through the values in each dimension and the block group itself through the unique combination of values in its collective dimensions.

In contrast, one hot encoding only provides an identification of the block group and does not contain, in itself, values relevant to the block group's aggregated features. Therefore, the embedding function 163 should be optimized by the ML-based link predictor 162 so that each block group embedding vector should be unique from any other block group embedding vector. Then, in step 315, the embedding vector for each block group can be stored in the embedded block group data store 170.

In some embodiments, the data loader 161 can be directly implemented into the embedding function 163 to skip step 314. In some embodiments, the embedding function 163 can skip steps 312 and 314 by training the embedding function 163 to distinguish which nodes are neighbors by feeding neighboring nodes with any given block group node. In an alternative embodiment, the block group embedding system 160 can complete step 314 to categorize the property-level data in the data loader 161 earlier than step 312.

Example Block Group Embedding Routine

Figure 4:
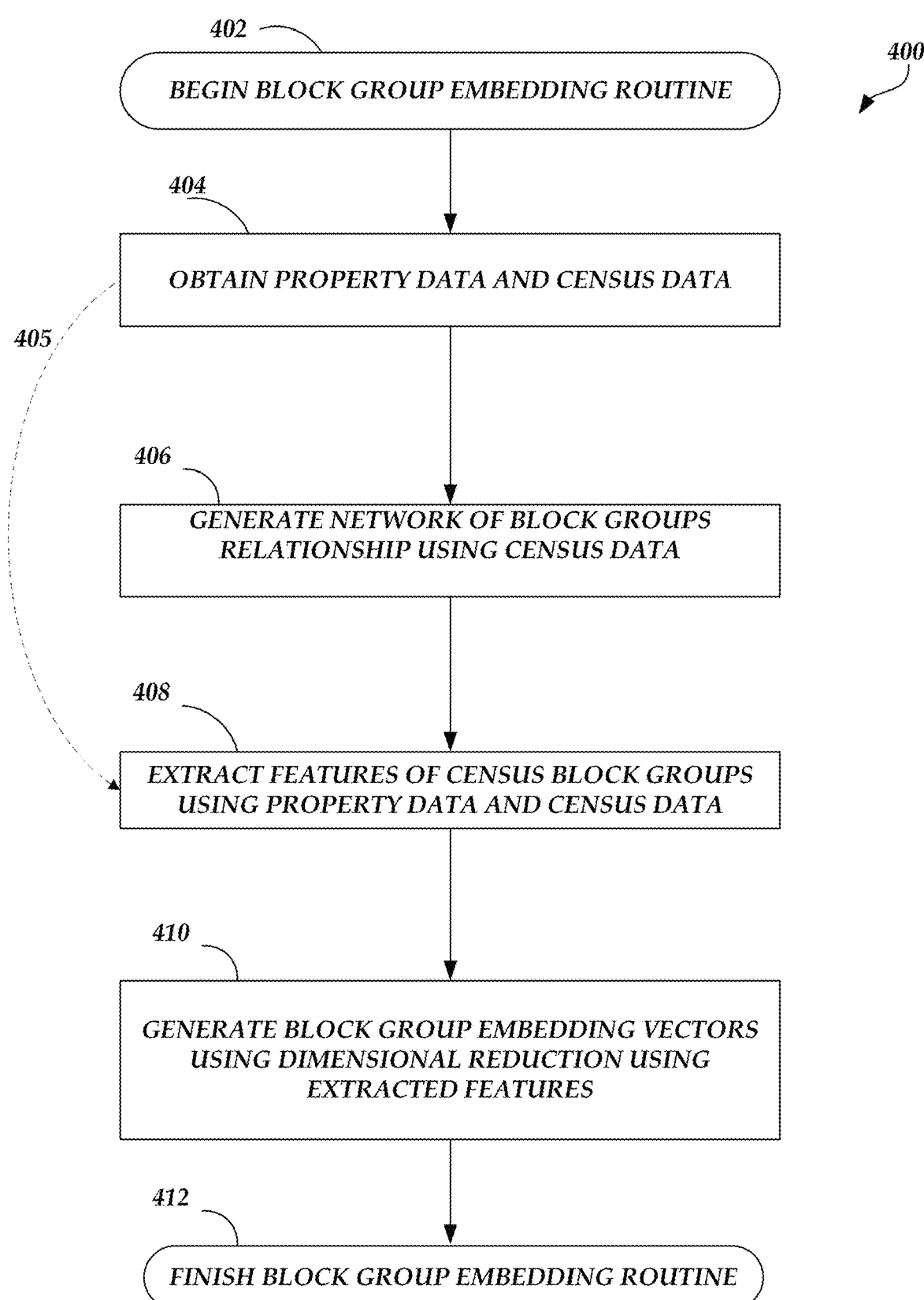
FIG. 4 is a flow chart depicting a block group embedding routine illustratively implemented by the system.

FIG. 4 is a flow chart depicting an example, block group embedding routine 400 illustratively implemented by the embedding process 200, according to one embodiment. For example, the block group embedding system 160 can configure the embedding process 200 of FIG. 2 (e.g., the block group graphing generator 140, the block group feature extractor 150, and block group embedding system 160) to execute the block group embedding routine 400. The block group embedding routine 400 begins at block 402.

At block 404, property-level data, such as property and census data, is obtained for each block group. The property-level data can include characteristics, demographics, transactions, web traffic, and spatial information on each block group. At block 406, the block group embedding system 160 can generate a graph of the block group network relationships to illustrate the spatial relationship between block groups using the census data. Optionally, block 406 can be skipped via step 405 to direct move from block 404 to block 408 because although the graph of the block group network relationships can improve performance in the block group embedding routine, the routine can still operate without this data by using the human-derived polygons depicting block groups in the census data. At block 408, the block group embedding system 160 can extract features for each block group from the property-level data. These features can include generating a sample of recent sales transactions and deriving trends of recent sales and statistics about the block groups. The block group embedding system 160 can take features for each block group in aggregate of all the properties or parcels within the block group. Finally, in block 410, block group embedding vectors can be generated using a dimensional reduction on the one hot encoded block groups and their extracted features. The dimensional reduction, described below, can utilize an artificial intelligence model to prepare embedding function that the block groups are fed into to reduce the dimensions of each block group and embed features into the outputted vectors. After the block group embedding system 160 generates a block group embedding vector for each block group, the block group embedding routine 400 ends, as shown at block 412.

Example Dimensional Reduction Routine

Figure 5:
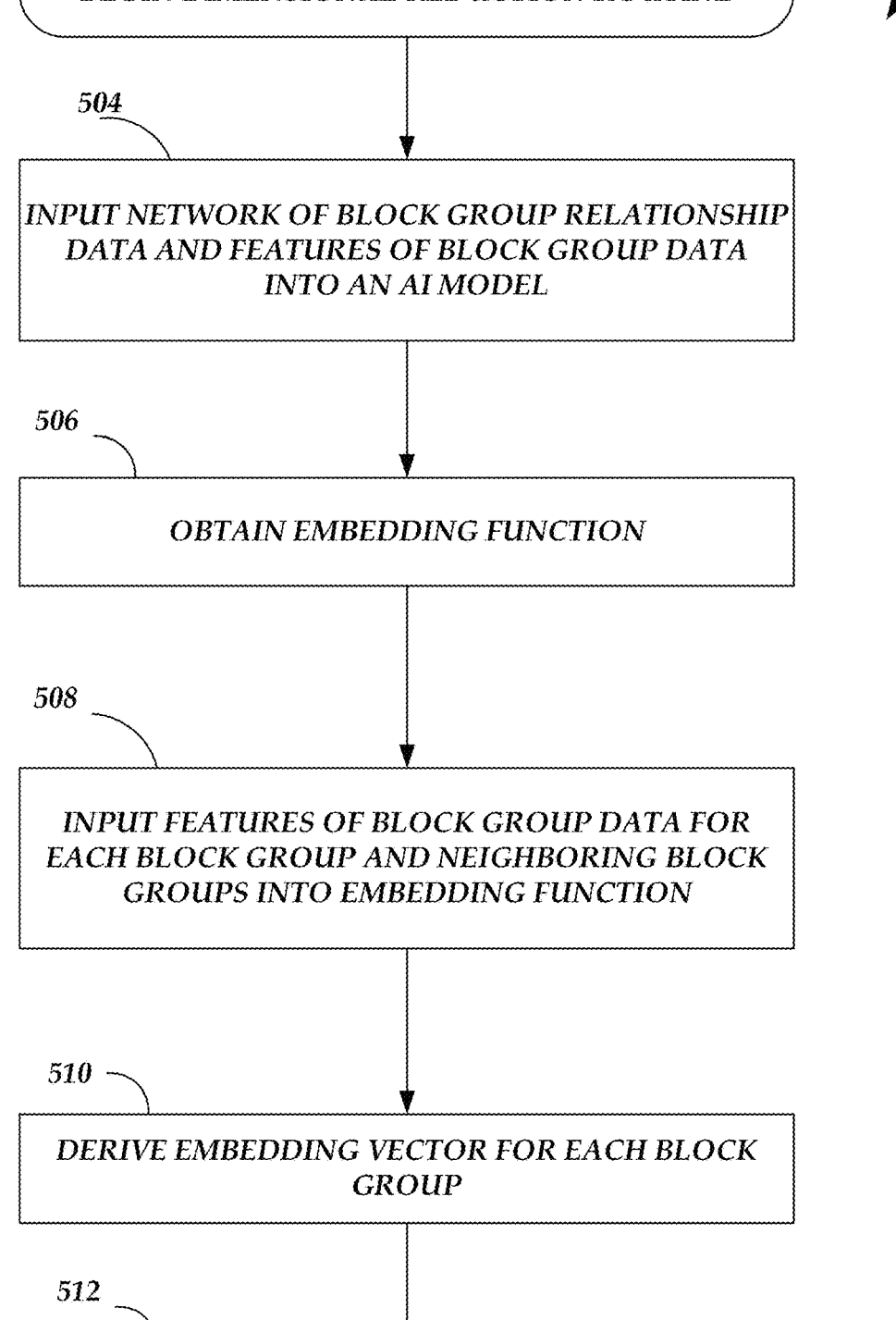
FIG. 5 is a flow chart depicting a dimensional reduction routine, illustratively implemented by the block group embedding system.

FIG. 5 is a flow chart depicting an example, dimensional reduction routine 500, illustratively implemented by the block group embedding system 160, according to one embodiment. For example, the block group embedding system 160 can configure the block group embedding system 160 of FIG. 2 (e.g., the ML-based link predictor 162, the data loader 161, and embedding function 163) to execute the dimensional reduction routine 500. The dimensional reduction routine 500 begins at block 502.

At block 504, intermediary data, such as the graph of the block group network relationships and extracted features of block groups, can be inputted into an artificial intelligence model to train predictions on whether block groups are related or neighbors. The artificial intelligence model can be a graph neural network, such as the GraphSAGE framework. Optionally, the block group embedding system 160 can input only the extracted features of block groups into the artificial neural network. At block 506, an embedding function, trained for optimization by the artificial intelligence model, can be obtained. At block 508, the block group embedding system 160 can use the embedding function for each block group by inputting the features of a given block group and the features of the block group determined to be neighbors to the given block group. A separate system can be implemented to determine which block groups are neighbors. Optionally, the block group embedding system 160 can train the embedding function to determine which block groups are neighbors. In an alternative embodiment, the block group embedding system 160 determining whether block groups are neighbors can occur before blocks 504 and/or 506. At block 510, the block group embedding system 160 can obtain embedding vectors for the block groups, with each embedding vector containing fewer dimensions than the one hot encoded block groups (e.g., 2, 4, 8, 10, 16, 32, 35, 50, 100, 1000, etc.). Each dimension can be values corresponding to the block group's features relative to other block groups. After the block group embedding system 160 generates a block group embedding vector for each block group, the dimensional reduction routine 500 ends, as shown at block 512.

Example User Interfaces

Figure 6A:
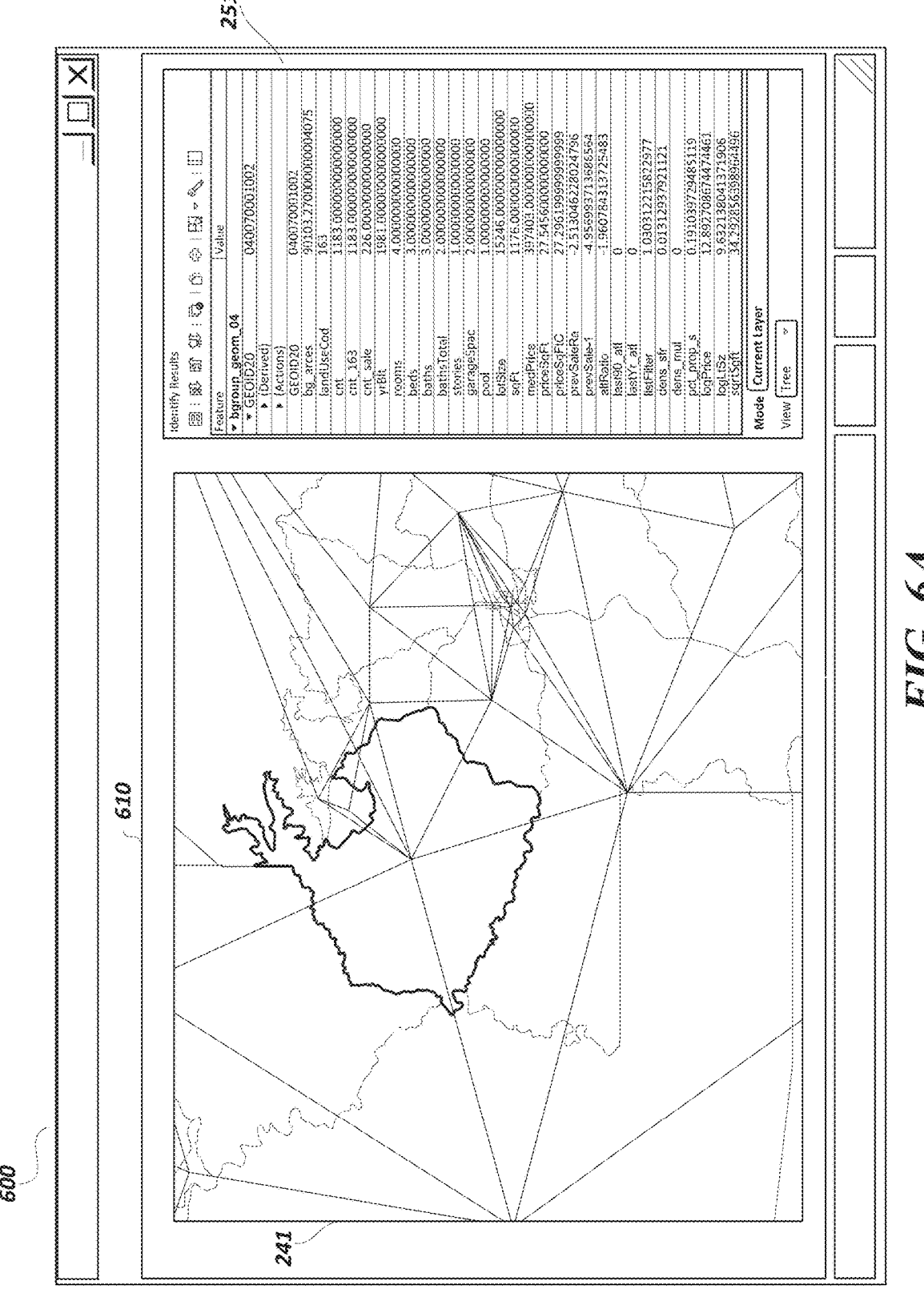
FIG. 6A illustrates an example user interface depicting the block group network graph and an illustration of the block group aggregate features.
Figure 6B:
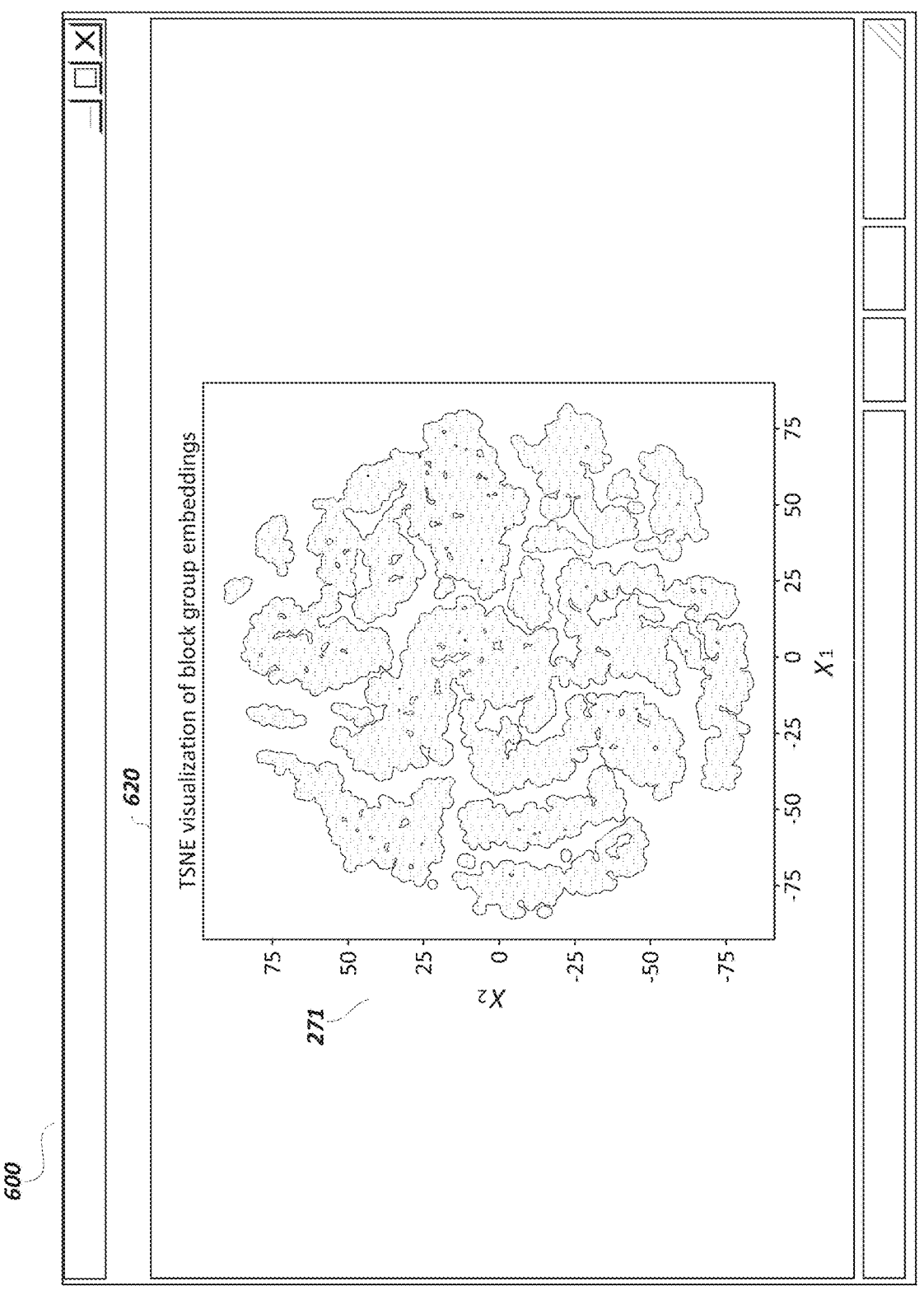
FIG. 6B illustrates an example user interface depicting the embedded 2-D block group graph.
Figure 6C:
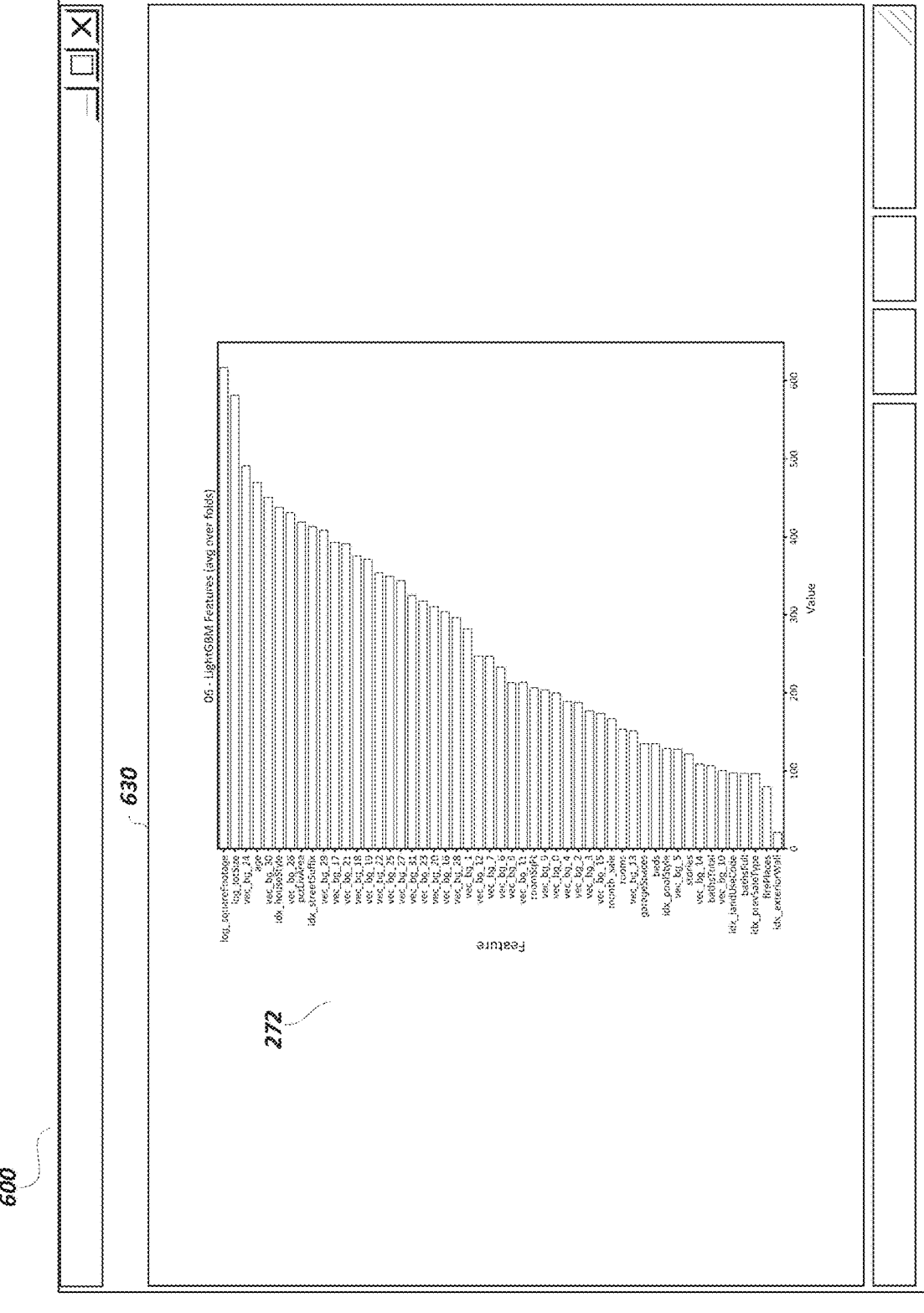
FIG. 6C illustrates an example user interface depicting the use of block group embedding vectors in an Automated Valuation Model (AVM)

FIGS. 6A, 6B, and 6C illustrate an example user interface 600 depicting graphs generated in the embedding process 200. The example user interface 600 may be rendered and displayed by a user device 102 in response to receiving user interface data. For example, when processed by the user device 102, the user interface data may cause the user device 102 to render and display the user interface 600. The user interface 600 can communicate with any of the data repositories (e.g., property data store 120, census data store 130, block group graph data store 141, block group feature data store 151, embedded block group data store 170, etc.) via the network 110 to render and display data or graphs in the data repositories on the user interface 600.

As illustrated in FIG. 6A, the user interface 600 includes a window 610 depicting the block group network graph 241 and the block group aggregate features 251. The block group network graph 241 may include one or more layers. Although FIG. 6A illustrates the block group network graph 241 and block group aggregate features 251 together, the figure is not meant to be limiting, and either block group network graph 241 or block group aggregate features 251 can be depicted on the user interface on their own or with other images. For example, one layer may include the human-derived polygons representing block groups, a second layer may highlight one or more selected block groups, and one or more third layers may include centroid lines representing connections to neighboring block groups. Via the user interface 600, a user may hide, unhide (e.g., make visible), delete, add, lock, and/or the like any of these layers. In addition, the user can use controls provided by the user interface 600 to adjust the hierarchy of the layers such that any one layer can sit on top of any other layer. The user interface 600 may also allow a user to change the color or transparency of any information depicted in a layer. While certain layers are described herein, this is not meant to be limiting. The block group network graph 241 can include more, fewer, and/or different layers, such as other layers that include connections based on a specified feature, adjoining block groups, or census tracts. Similarly, the block group aggregate features 251 can be adjusted to depict selected or all features. The block group embedding system 160 may group features for viewing and/or allow for the viewing of features from different block groups compared to each.

As illustrated in FIG. 6B, the user interface 600 includes a window 620 depicting the embedded 2-D block group graph 271. As described above, the embedded 2-D block group graph 271 is a TSNE visualization of the embedding vectors. Optionally, the embedded 2-D block group graph 271 can depict 2-dimensional, 3-dimensional vectors, or high numbers of dimensions. For example, the embedded 2-D block group graph 271 can depict 24-dimensioned embedding vectors that have been aggregated further into two compiled features that can be used for the TSNE visualization. In addition, the block group embedding system 160 can adjust the embedded 2-D block group graph 271 to depict a subset of the block groups or to focus on different features in the x and y-axis. The alternations to the embedded 2-D block group graph 271 disclosed here are not intended to be limiting and can include more, fewer, and/or different alternations.

FIG. 6C illustrates an example user interface 600 includes a window 630 depicting the use of block group embedding vectors in an Automated Valuation Model (AVM), such as the embedded block group AVM graph 272. The example user interface 600 may be rendered and displayed by a user device 102 in response to receiving user interface data. For example, when processed by the user device 102, the user interface data may cause the user device 102 to render and display the user interface 600. Similar to the block group aggregate features 251, the features depicted in the embedded block group AVM graph 272 can be altered to increase or decrease the number of features. The user interface 600 may also allow a user to change the color or transparency of any information depicted. The alternations to the embedded block group AVM graph 272 disclosed here are not intended to be limiting and can include more, fewer, and/or different alternations.

Additional Embodiments

As mentioned above, although this disclosure refers to dimensional reduction due to the high dimensions related to census block groups, this disclosure should not be limited to census block groups but to any grouping of parcels—cities, towns, zip codes, neighborhoods, tracts, states, etc. For example, the techniques, methods, and systems disclosed herein can apply to any grouping of parcels and/or any type of spatial data.

Various example of user devices 102 are shown in FIG. 1, including a desktop computer, laptop, and mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In addition, a user device 102 may execute an application (e.g., a browser, a stand-alone application, etc.) that allows a user to request and/or view growth predictions for one or more parcels.

The network 110 may include any wired network, wireless network, or a combination thereof. For example, the network 110 may be a personal area network, local area network, wide area network, over-the-air broadcast network (e.g., for radio or television), cable network, satellite network, cellular telephone network, or a combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer-implemented system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid-state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, multiple processors or processor cores, or on other parallel architectures rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application-specific integrated circuit (ASIC), a field programmable gate array (FPGA) or other programmable logic devices, discrete gate or transistor logic, discrete hardware components, or any combination thereof designed to perform the functions described herein. For example, a processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, a software module executed by a processor device, or a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. Alternatively, the storage medium can be integral to the processor device. For example, the processor device and the storage medium can reside in an ASIC. The ASIC can reside in a user terminal. Alternatively, the processor device and the storage medium can reside as discrete components in a user terminal.

The conditional language used herein, such as, among others, "can," "could," "might," "may," "e.g.," and the like, unless specifically stated otherwise or otherwise understood within the context as used, is generally intended to convey that certain embodiments include, while other embodiments do not include certain features, elements or steps. Thus, such conditional language is not generally intended to imply that features, elements, or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive languages such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above-detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. Accordingly, the scope of certain embodiments disclosed herein is indicated by the appended claims rather than by the foregoing description. All changes which come within the meaning and range of equivalency of the claims are to be embraced within their scope.

What is claimed is:

1. A computer-implemented method for embedding parcel groups, the computer-implemented method comprising:

obtaining a geographic unit grouping, wherein the geographic unit grouping comprises at least two parcel groups including a first parcel group and a second parcel group, wherein each of the first parcel group and the second parcel group comprises at least one parcel;

obtaining property-level data for the first and second parcel groups in the geographic unit grouping;

generating a graph model using the property-level data, wherein the graph model comprises one or more polygons for each of the first and second parcel groups that indicate a relationship between a geographic area of the first parcel group and a geographic area of the second parcel group;

generating property features for each of the first and second parcel groups using the property-level data;

training an embedding function to generate an embedding vector that include a number of dimensions that is less than a number of the at least two parcel groups based on inputting the property features and the one or more polygons of the graph model into a neighbor predicting artificial intelligence model, wherein the neighbor predicting artificial intelligence model is trained to determine a relationship between the at least two parcel groups, the embedding vector comprising a unique identification of a parcel group based on the relationship between the at least two parcel groups;

generating a first embedding vector of the first parcel group and a second embedding vector for the second parcel group using the trained embedding function;

applying the first and second embedding vectors as an input to an artificial intelligence model, wherein application of the first and second embedding vectors as the input to the artificial intelligence model causes the artificial intelligence model to produce an output; and generating an outcome for the first parcel group based on the output.

2. The method of claim 1, wherein the property-level data comprises property data and census data.

3. The method of claim 1, wherein generating the property features for each of the first and second parcel groups comprises an aggregation of parcel features for each of the at least one parcels in the first and second parcel groups respectively.

4. The method of claim 1, further comprising generating a visualization of the first and second embedding vectors.

5. The method of claim 1, wherein the artificial intelligence model comprises one of an automated valuation model, a rental valuation model, or a neighborhood recommendation model.

6. The method of claim 1, wherein the outcome comprises one of a housing value, a rental value, or a recommendation for the first parcel group.

7. The method of claim 1, wherein training the embedding function comprises:

obtaining the neighbor predicting artificial intelligence model;

generating the embedding function using the property features and the one or more polygons of the graph model as an input to train the neighbor predicting artificial intelligence model; and training the embedding function using the neighbor predicting intelligence model and the property features to generate the trained embedding function;

wherein generating the first embedding vector using the trained embedding function comprises:

determining a neighbor score between the first and second parcel groups corresponding to the property features using the neighbor predicting artificial intelligence model; and inputting into the trained embedding function the property features of the first parcel group and, if the neighbor score meets a neighbor threshold, further inputting into the trained embedding function the property features of the second parcel group.

8. The method of claim 7, wherein determining the neighbor score further comprises weighing the property features unequally.

9. The method of claim 1, wherein obtaining the geographic unit grouping further comprises encoding each of the first and second parcel groups.

10. The method of claim 1, wherein the embedding vector comprise a dimensionally reduced vector of the first and second parcel groups, and wherein a dimension is encoded with the property feature of the first and second parcel group.

11. The method of claim 10, wherein the number of dimensions for each of the embedding vector comprises 32-dimensions.

12. The method of claim 1, further comprising:

generating a plurality of embedding vectors from the at least two parcel groups using the trained embedding function; and training the artificial intelligence model using the plurality of embedding vectors prior to generating the first embedding vector and the second embedding vector.

13. A system for parcel group embedding, the system comprising:

memory that stores computer-executable instructions; and a processor in communication with the memory, wherein the computer-executable instructions, when executed by the processor, cause the processor to:

obtain a geographic unit grouping, wherein the geographic unit grouping comprises at least two parcel groups including a first parcel group and a second parcel group, wherein each of the first parcel group and the second parcel group comprises at least one parcel;

obtain property-level data for the first and second parcel groups in the geographic unit grouping;

generate a graph model using the property-level data, wherein the graph model comprises one or more polygons for each of the first and second parcel groups that indicate a relationship between a geographic area of the first parcel group and a geographic area of the second parcel group;

generate property features for each of the first and second parcel groups using the property-level data;

train an embedding function to generate an embedding vector that include a number of dimensions that are less than a number of the at least two parcel groups based on inputting the property features and the one or more polygons of the graph model into a neighbor predicting artificial intelligence model, wherein the neighbor predicting artificial intelligence model is trained to determine a relationship between the at least two parcel groups, the embedding vector comprising a unique identification of a parcel group based on the relationship between the at least two parcel groups;

generate a first embedding vector for the first parcel group and a second embedding vector for the second parcel group using the trained embedding function;

apply the first and second embedding vectors as an input to an artificial intelligence model, wherein application of the first and second embedding vectors as the input to the artificial intelligence model causes the artificial intelligence model to produce an output; and generate an outcome for the first parcel group based on the output.

14. The system of claim 13, wherein the property-level data comprises property data and census data.

15. The system of claim 13, wherein the property features for each of the first and second parcel groups comprises an aggregation of parcel features for each of the at least one parcels in the first and second parcel groups respectively.

16. The system of claim 13, wherein the computer-executable instructions, when executed, further cause the processor to generate a visualization of the first and second embedding vectors.

17. The system of claim 13, wherein the artificial intelligence model comprises one of an automated valuation model, a rental valuation model, or a neighborhood recommendation model.

18. The system of claim 13, wherein the outcome comprises one of a housing value, a rental value, or a recommendation for the first parcel group.

19. The system of claim 13, wherein the computer-executable instructions, when executed, further cause the processor to train the embedding function by:

obtaining the neighbor predicting artificial intelligence model;

generating the embedding function using the property features and the one or more polygons of the graph model as an input to train the neighbor predicting artificial intelligence model; and training the embedding function using the neighbor predicting intelligence model and the property features to generate the trained embedding function;

wherein the computer-executable instructions, when executed, further cause the processor to generate the first embedding vector using the trained embedding function by:

determining a neighbor score between the first and second parcel groups corresponding to the property features using the neighbor predicting artificial intelligence model; and inputting into the trained embedding function the property features of the first parcel group and, if the neighbor score meets a neighbor threshold, further inputting into the trained embedding function the property features of the second parcel group.

20. The system of claim 13, wherein the computer-executable instructions, when executed, further cause the processor to obtain an encoded identification of the at least one parcels.

21. The system of claim 13, wherein the embedding vector comprise a dimensionally reduced vector of the first and second parcel groups, and wherein a dimension is encoded with the property feature of the first and second parcel group.

22. The system of claim 21, wherein each of the embedding vector comprises 32-dimensions.

23. A non-transitory, computer-readable medium comprising computer-executable instructions for embedding parcel groups, wherein the computer-executable instructions, when executed by a computer system, cause the computer system to:

obtain a geographic unit grouping, wherein the geographic unit grouping comprises at least two parcel groups including a first parcel group and a second parcel group, wherein each of the first parcel group and the second parcel group comprises at least one parcel;

obtain property-level data for the first and second parcel groups in the geographic unit grouping;

generate a graph model using the property-level data, wherein the graph model comprises one or more polygons for each of the first and second parcel groups that indicate a relationship between a geographic area of the first parcel group and a geographic area of the second parcel group;

generate property features for each of the first and second parcel groups using the property-level data;

train an embedding function to generate an embedding vector that include a number of dimensions that are less than a number of the at least two parcel groups based on inputting the property features and the one or more polygons of the graph model into a neighbor predicting artificial intelligence model, wherein the neighbor predicting artificial intelligence model is trained to determine a relationship between the at least two parcel groups, the embedding vector comprising a unique identification of a parcel group based on the relationship between the at least two parcel groups;

generate a first embedding vector of the first parcel group and a second embedding vector for the second parcel group using the trained embedding function;

apply the first and second embedding vectors as an input to an artificial intelligence model, wherein application of the first and second embedding vectors as the input to the artificial intelligence model causes the artificial intelligence model to produce an output; and generate an outcome for the first parcel group based on the output.

* * * * *